US008132844B2

(12) United States Patent
Sonnek et al.

(10) Patent No.: US 8,132,844 B2
(45) Date of Patent: Mar. 13, 2012

(54) INTUITIVE CONTROL SYSTEM FOR POWER ASSISTED VEHICLE DOORS

(75) Inventors: Tom F. Sonnek, Reinbeck, IA (US); Brandon L. Hemann, New Hampton, IA (US); Robert W. Donaldson, Eureka, MO (US)

(73) Assignee: Trimark Corporation, New Hampton, IA (US)

( * ) Notice: Subject to any disclaimer, the term of this patent is extended or adjusted under 35 U.S.C. 154(b) by 80 days.

(21) Appl. No.: 12/712,766

(22) Filed: Feb. 25, 2010

(65) Prior Publication Data

US 2011/0204675 A1 Aug. 25, 2011

(51) Int. Cl.
*B60J 5/00* (2006.01)

(52) U.S. Cl. .................................................... 296/146.4

(58) Field of Classification Search ............... 296/146.4; 74/471 XY, 471 R See application file for complete search history.

(56) References Cited

U.S. PATENT DOCUMENTS 4,237,629 A 12/1980 Schmidt
4,275,611 A 6/1981 Asher
4,306,208 A 12/1981 Coors
5,087,799 A 2/1992 Pariot et al.
5,140,320 A 8/1992 Gerbier et al.
5,466,111 A * 11/1995 Meyer ........................... 414/462
6,065,185 A 5/2000 Breed et al.
6,349,448 B1 2/2002 Breed et al.
6,598,935 B2 * 7/2003 Colliar et al. .............. 297/183.9
6,681,444 B2 1/2004 Breed et al.
6,729,829 B2 * 5/2004 Zimmer ........................ 414/522
6,896,563 B1 5/2005 Dickson
6,928,694 B2 8/2005 Breed et al.
7,438,346 B1 10/2008 Breed
2002/0084679 A1 * 7/2002 Colliar et al. .............. 297/217.3
2003/0108412 A1 * 6/2003 Zimmer ........................ 414/522
2009/0120002 A1 5/2009 Domholt

FOREIGN PATENT DOCUMENTS

FR 1 444 271 7/1976

* cited by examiner

*Primary Examiner* — Hilary Gutman
(74) *Attorney, Agent, or Firm* — McKee, Voorhees & Sease, P.L.C.

(57) ABSTRACT

A heavy vehicle door or ramp is opened and closed using an intuitive control system. The door includes a latch assembly, a lock assembly, and a power unit to assist in opening and closing the door. The door includes an interior joy stick handle and an exterior lever handle. From outside the vehicle, the door is opened and closed by pivoting the lever handle downwardly and upwardly, respectively. From the interior of the vehicle, the joy stick handle is pulled inwardly to close the door and push outwardly to open the door. Pivoting the joystick handle forwardly engages the blast locks, while pivoting the joystick handle rearwardly unlatches the latch assembly and disengages the blast locks. The power assist unit is actuated by pivotal movement of the outside door handle and lateral pivotal movement of the interior joystick handle. Perimeter bump strips offer safety functions to prevent injuries when remote function is active.

10 Claims, 37 Drawing Sheets

INTUITIVE CONTROL SYSTEM FOR POWER ASSISTED VEHICLE DOORS

BACKGROUND OF THE INVENTION

Heavy duty armored vehicles, used for example, by the military, must be built to withstand forces far greater than encountered by conventional consumer cars and industrial trucks. The utilization of increasingly powerful explosive devices such as IED's, RPG's, and EFP's by hostile insurgent forces has compelled the defense industry to respond by deploying heavier armor on their tactical armored vehicles. While necessary to protect military personnel, heavier armor creates unique problems. The weight of heavily armored vehicle doors and ramps often exceeds 200 lbs., and in some instances, may exceed 1,000 lbs. To open and close such doors or ramps requires assistance from electric, pneumatic, or hydraulic powered units. Such power assisted doors and ramps are known in the industry. Prior art powered doors require separate mechanical and electrical systems, with separate control handles and/or switches for the door and locks, which result in non-integrated and complicated door functions. These complications unnecessarily lead to increased difficulties and time in opening and closing the heavy doors of these armored vehicles, particularly in emergency situations.

Accordingly, a primary objective of the present invention is the provision of an improved intuitive motion control system for heavy, power assisted vehicle doors, ramps, and hatches.

Another objective of the present invention is the provision of a mechatronic assembly which simplifies a soldier's ingress and egress from heavily armored vehicles that require power assisted opening and closing of doors.

Another objective of the present invention is the provision of an armored vehicle door having an intuitive joystick control system for locking, unlocking, latching, unlatching, opening and closing the door, ramp or hatch.

A further objective of the present invention is the provision of an improved method of operating a heavy duty vehicle door, ramp or hatch.

Still another objective of the present invention is the provision of an improved power assisted door with a safe and durable handle assembly for opening and closing the door from both inside and outside the vehicle.

Another objective of the present invention is the provision of an improved control system for operating an armored vehicle door or ramp in a minimal amount of time.

These and other objectives will become apparent from the following description of the invention.

SUMMARY OF THE INVENTION

The intuitive motion control system for operating a heavy armored vehicle door or ramp includes a power assist module that can simply, safely and quickly open and close the door with intuitive motions. The system connects the operation of the main latch, the combat or blast locks, and the power assist open/close unit to a single control point on the inside door handle, to the outside door handle, and to an exterior emergency egress override system for first responders. The simple functionality of the intuitive system reduces complexity for the soldiers and promotes safety and reliability in the field.

The control system includes a door module containing the linear actuator, integrated motion control system, backup power source, control sensors/valves, safety strips, and the mechanical hardware required to articulate the door, ramp or hatch between open and closed positions, as well as actuating the blast locks and door latch. The door includes an exterior handle and an interior joystick. The joystick motion coincides with the desired direction of door travel so as to be intuitive for the soldier's ingress and egress from the heavily armored vehicle. The system is designed to withstand the rigors of battle and rugged off-road abuse for easy door operation by a $5^{th}$ percentile female soldier or a $95^{th}$ percentile male soldier.

DETAILED DESCRIPTION OF THE PREFERRED EMBODIMENTS

Figure 1B:
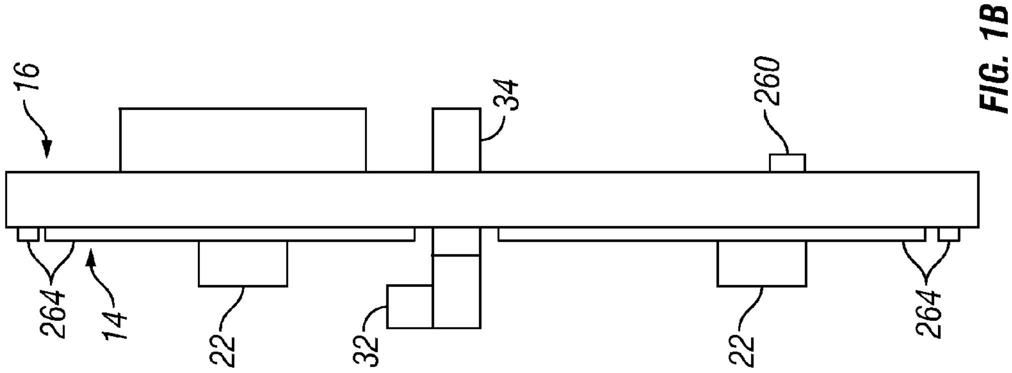
FIG. 1B is a schematic side view of the heavy door of FIG. 1A.
Figure 1A:
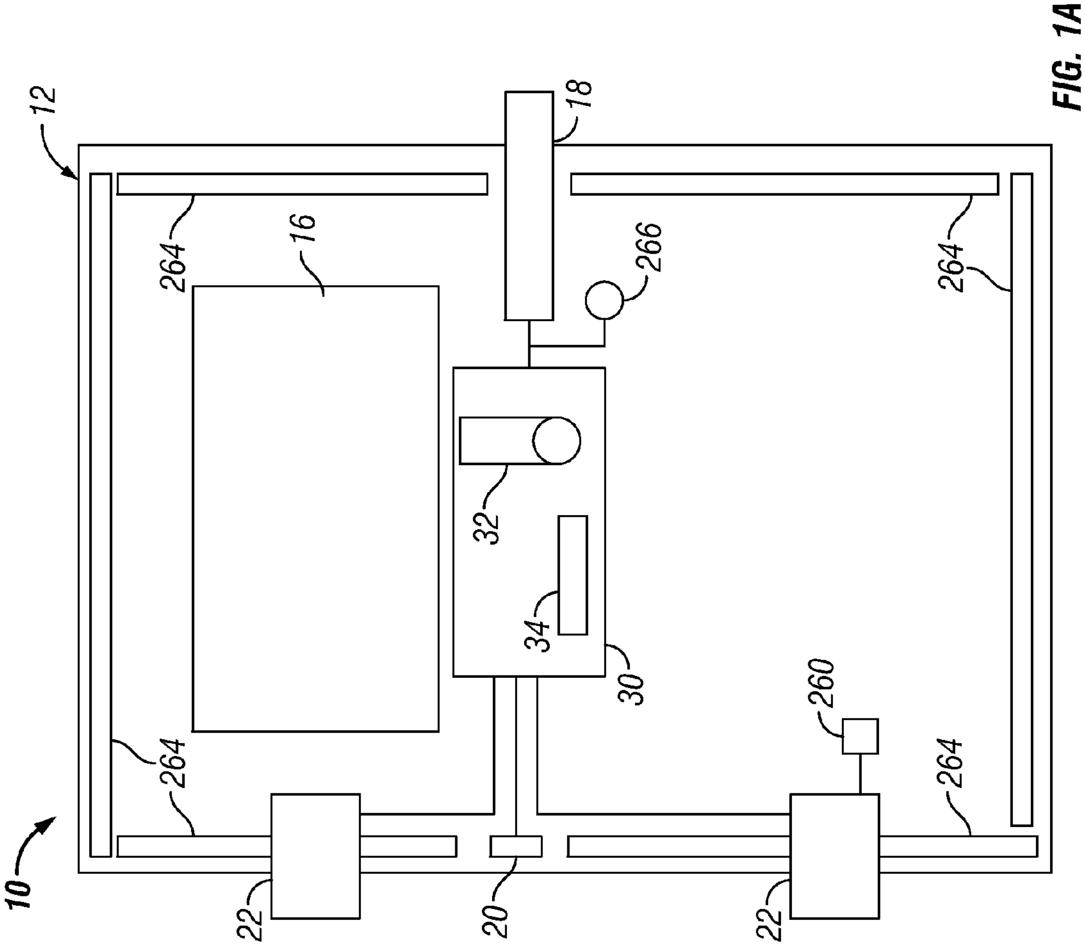
FIG. 1A is a schematic view of a heavy door having the control system of the present invention.
Figure 1:
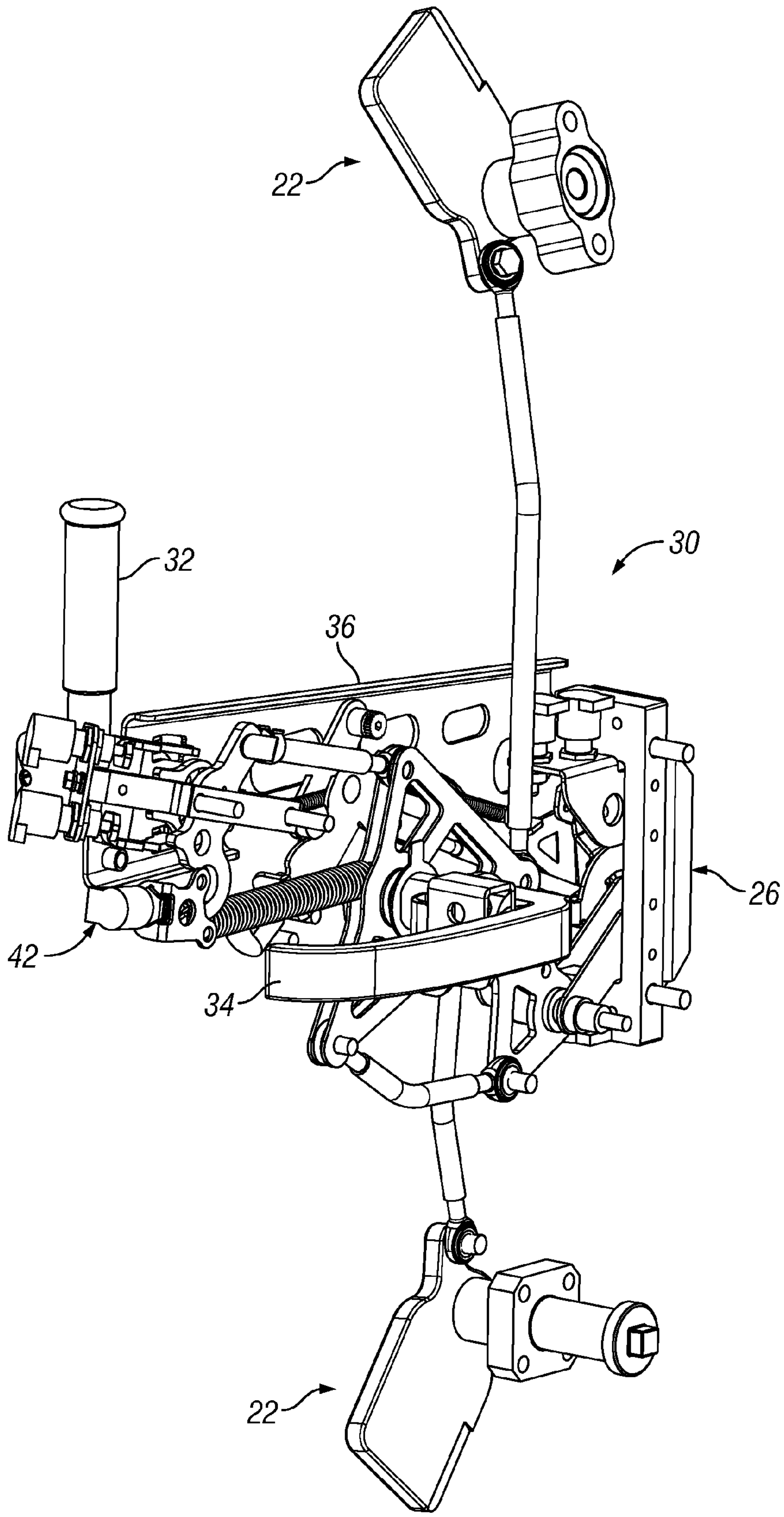
FIG. 1 is a perspective view of the intuitive control system for a heavy, power assisted door, ramp or hatch according to the present invention.

As shown in FIG. 1A, the intuitive control system 10 of the present invention is intended for use on a heavy door, ramp or hatch 12 of a vehicle, such as an armored military vehicle. The terms door, ramp and hatch are used synonymously in this description. As shown in FIG. 1B, the door 12 has an interior side 14 and an exterior side 16. As shown in FIGS. 1A and 1B, a power assist unit 18 is mounted within the door 12. The power assist unit 18 has opposite ends connected to the door 12 and the door frame, and is extensible through electric, hydraulic, or pneumatic means so as to move the door 12 between open and closed positions. The door 12 may include a latch assembly 20 which is operable between a latched position to retain the door in a closed position and an unlatched position to allow the door to open. The door 12 also includes a blast or combat lock assembly 22 moveable between locked and unlocked positions for additional door security.

A control handle module 30 is provided on the door 12 and operably connected to the power assist unit 18, the latch assembly 20, and the blast lock assembly 22. The handle module 30 includes an interior assembly 32 and an exterior lever handle 34. A mounting plate 36 supports various linkage components within the door that tie together the joystick module 32, the outside handle lever 34, the power assist unit 18, the latch assembly 20, and the blast block assembly 22, as described below.

Figure 6:
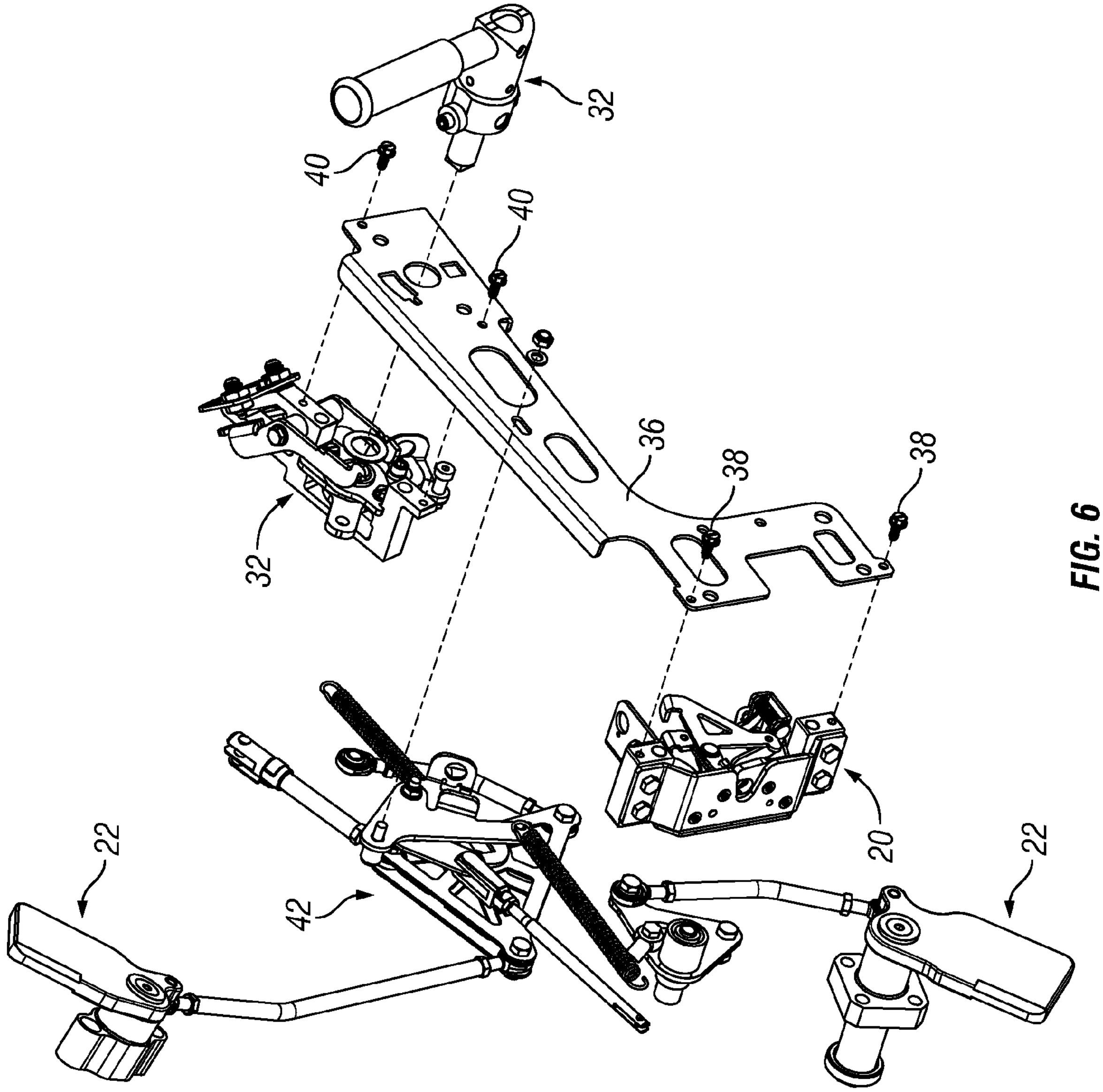
FIG. 6 is a partially exploded view of the mechanical control system for use with an electronic actuator or other device with electric inputs.
Figure 7:
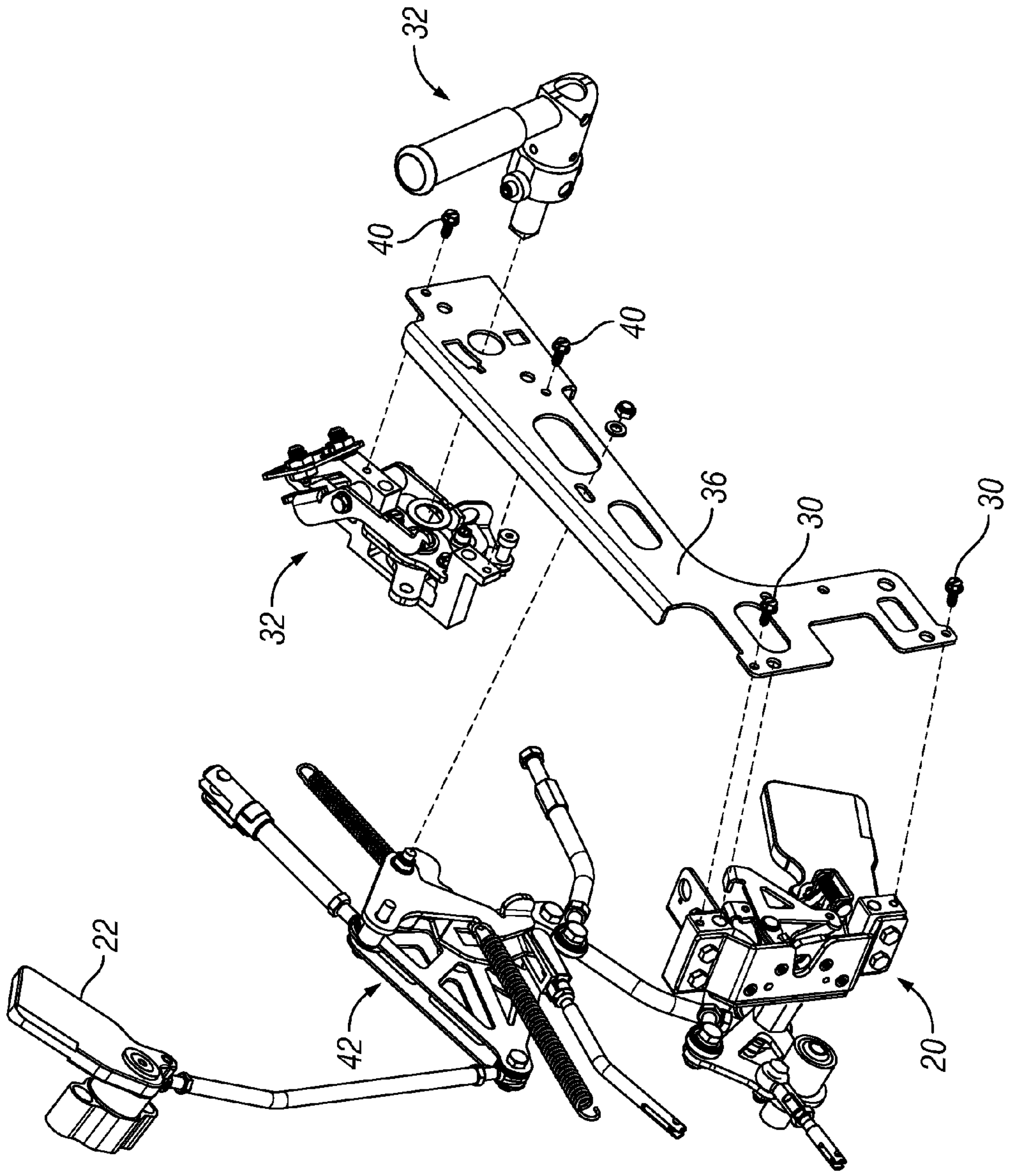
FIG. 7 is a partially exploded view of the system for use with a pneumatic actuator or other device with valve type inputs.
Figure 8:
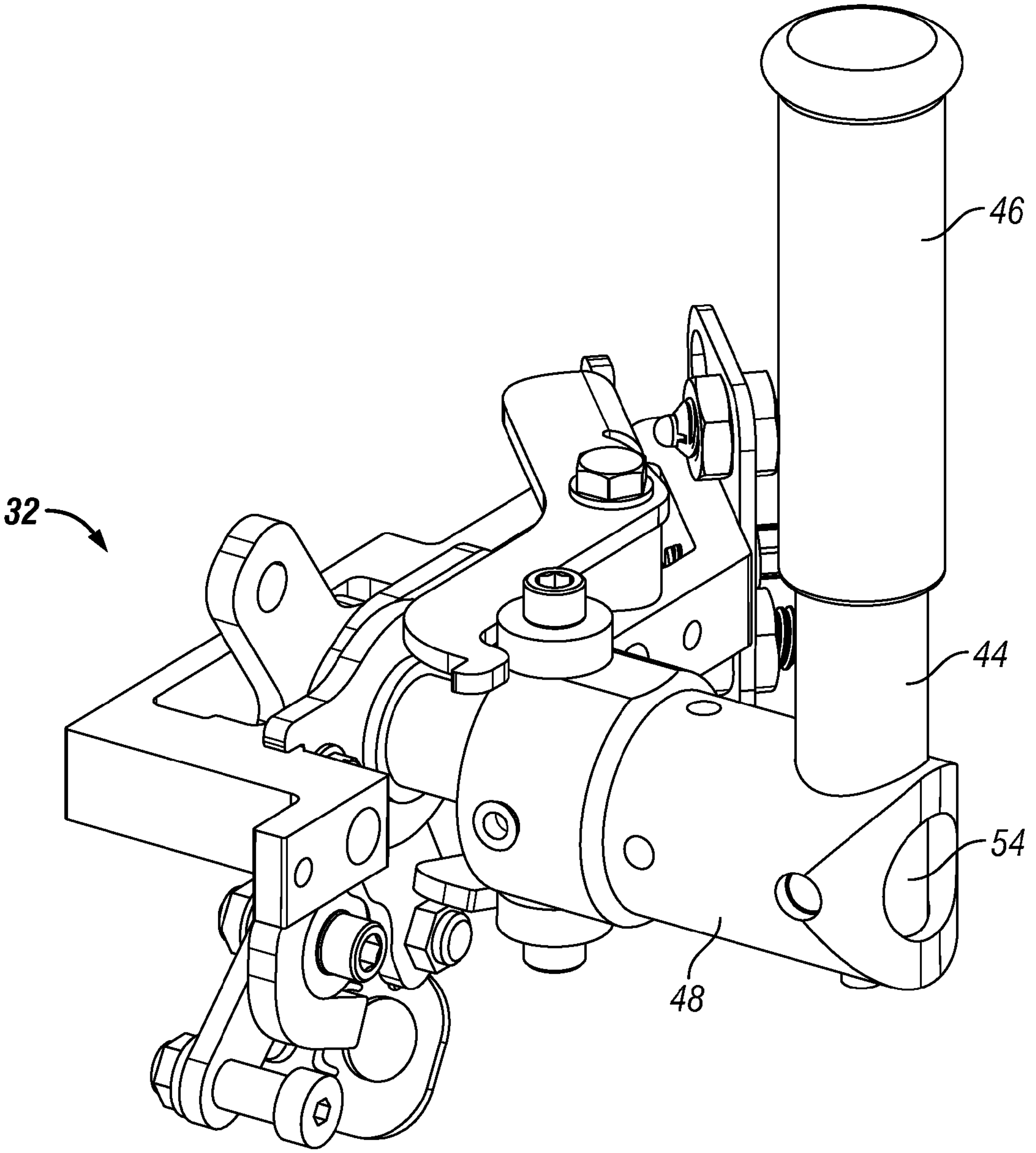
FIG. 8 is a perspective view of the joystick module of the system.

The mounting plate 36 supports the latch assembly 20 with screws 38 and supports the joystick assembly 32 with screws 40. A linkage assembly 42 is bolted to the mounting plate 36, as seen in FIGS. 6 and 7.

Figure 12:
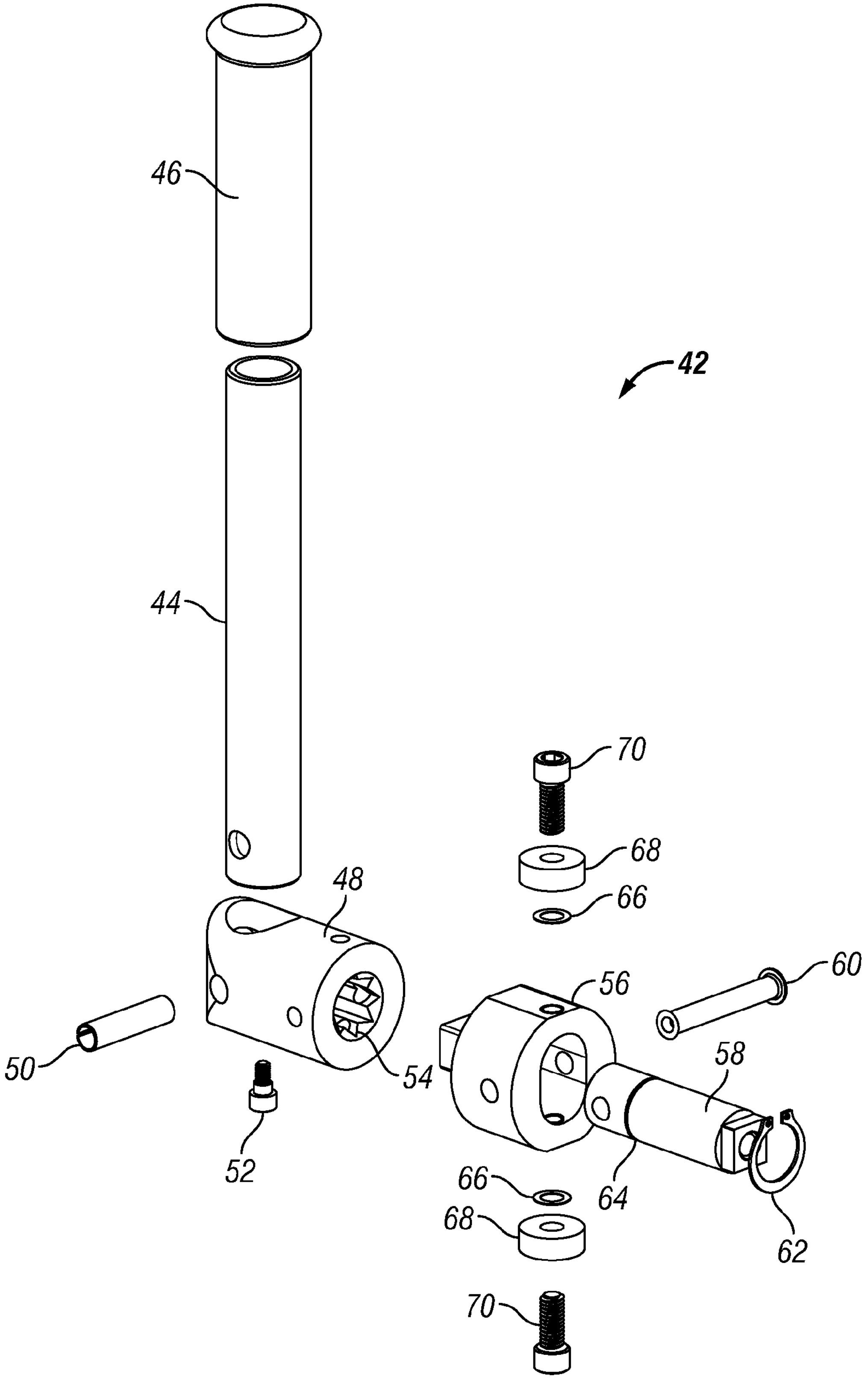
FIG. 12 is another exploded view of the joystick shown in FIG. 11.

The components of the joystick module 32 are shown in FIGS. 8-12. The joystick module includes a handle 44 with a grip 46. The handle 44 is mounted in a tubular support 48 via a pin 50. The inner end of the support 48 has a geometric opening 54 adapted to matingly receive an outer end of a link 56, as seen in FIG. 12. A shaft 58 extends into the opposite end of the link 56 and is retained by a rivet 60. A snap ring 62 is received in a groove 64 on the shaft 58. The link 56 is substantially tubular, with flattened top and bottom surfaces to which a washer 66 and a bearing 68 are mounted with a bolt 70.

Figure 9:
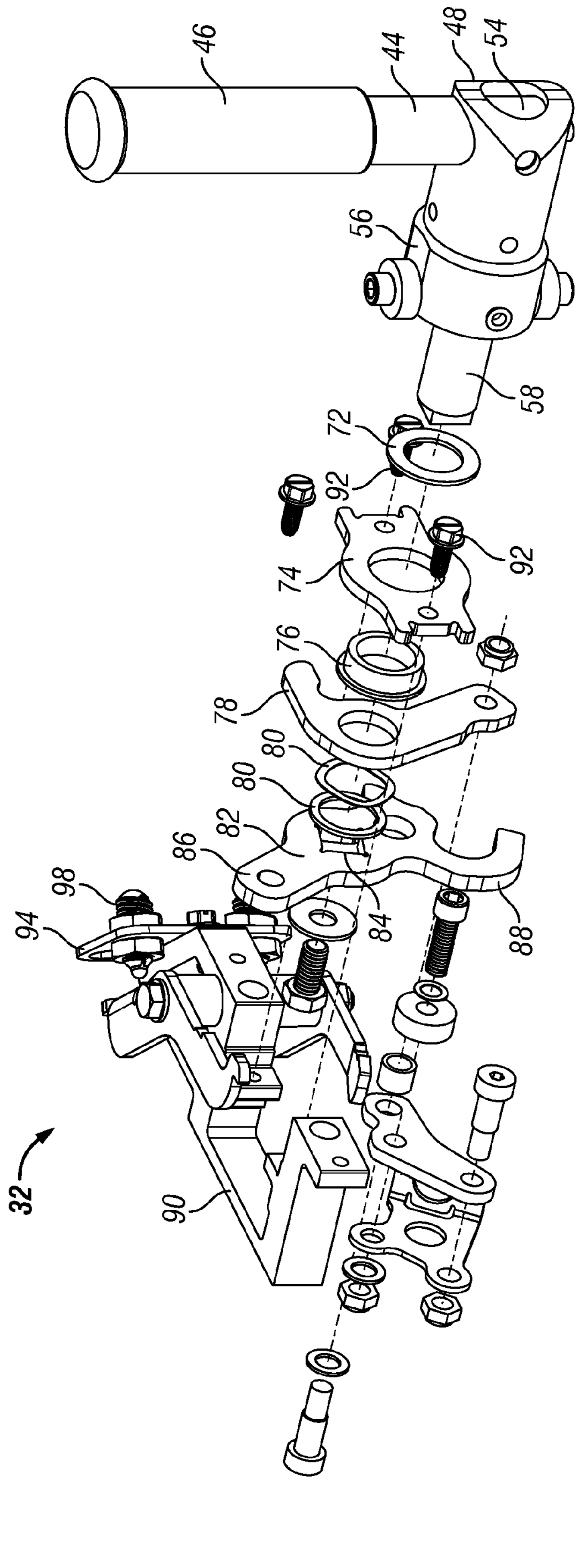
FIG. 9 is an exploded view of the joystick module.

As best seen in FIG. 9, the shaft 58 of the joystick assembly 32 extends through a series of components, including a washer 72, a bracket 74, a bushing 76, a link 78, a pair of washers 80, and a link cam 82. The shaft 58 is not fixed to the components 72-80. The end of the shaft 58 has a square or other geometric shape so as to be matingly received within a complementary square or geometric opening 84 in the link cam 82 such that rotation of the shaft 58 about its longitudinal axis will impart rotation to the link cam 82. The link cam 82 has an upper leg 86 to be connected to blast lock assembly 22 and to bias the cam 82 and also includes a lower finger or hook 88. A positive mechanical spring loaded detent may be provided.

Figure 10:
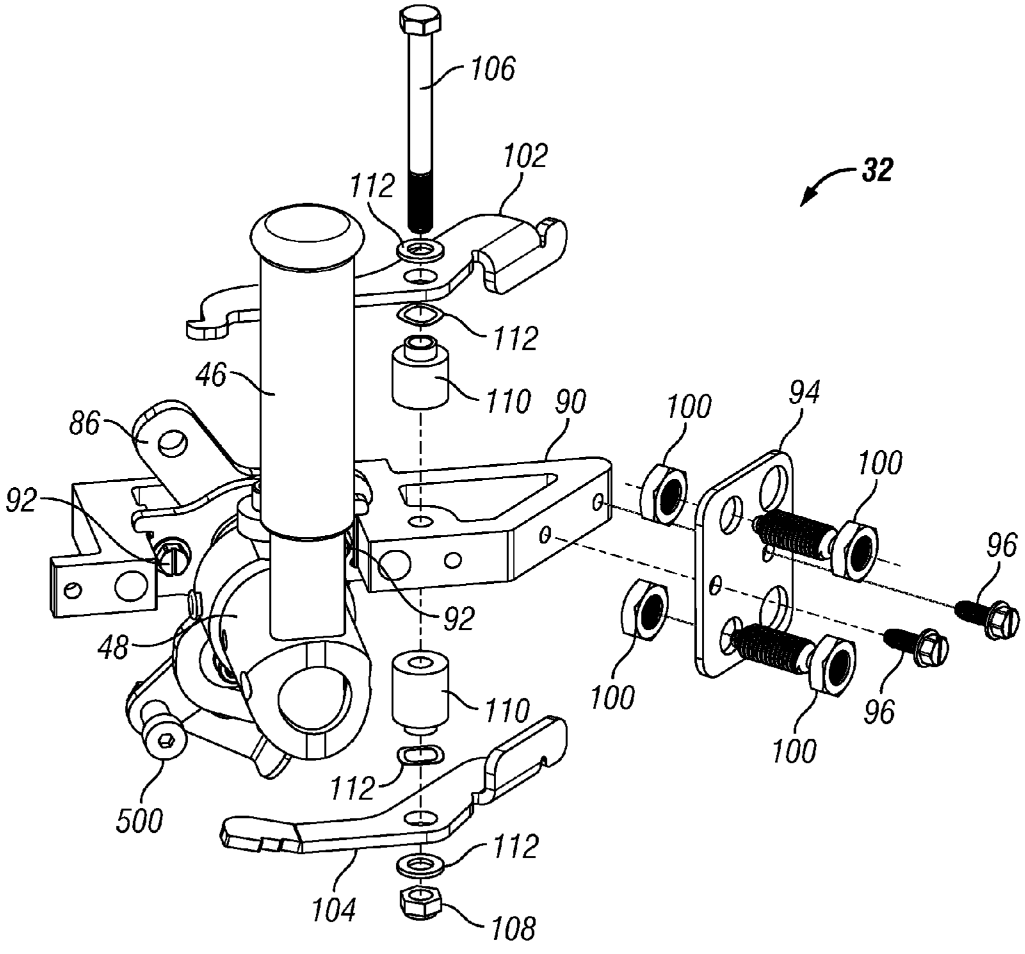
FIG. 10 is a further partially exploded view of the joystick module.
Figure 11:
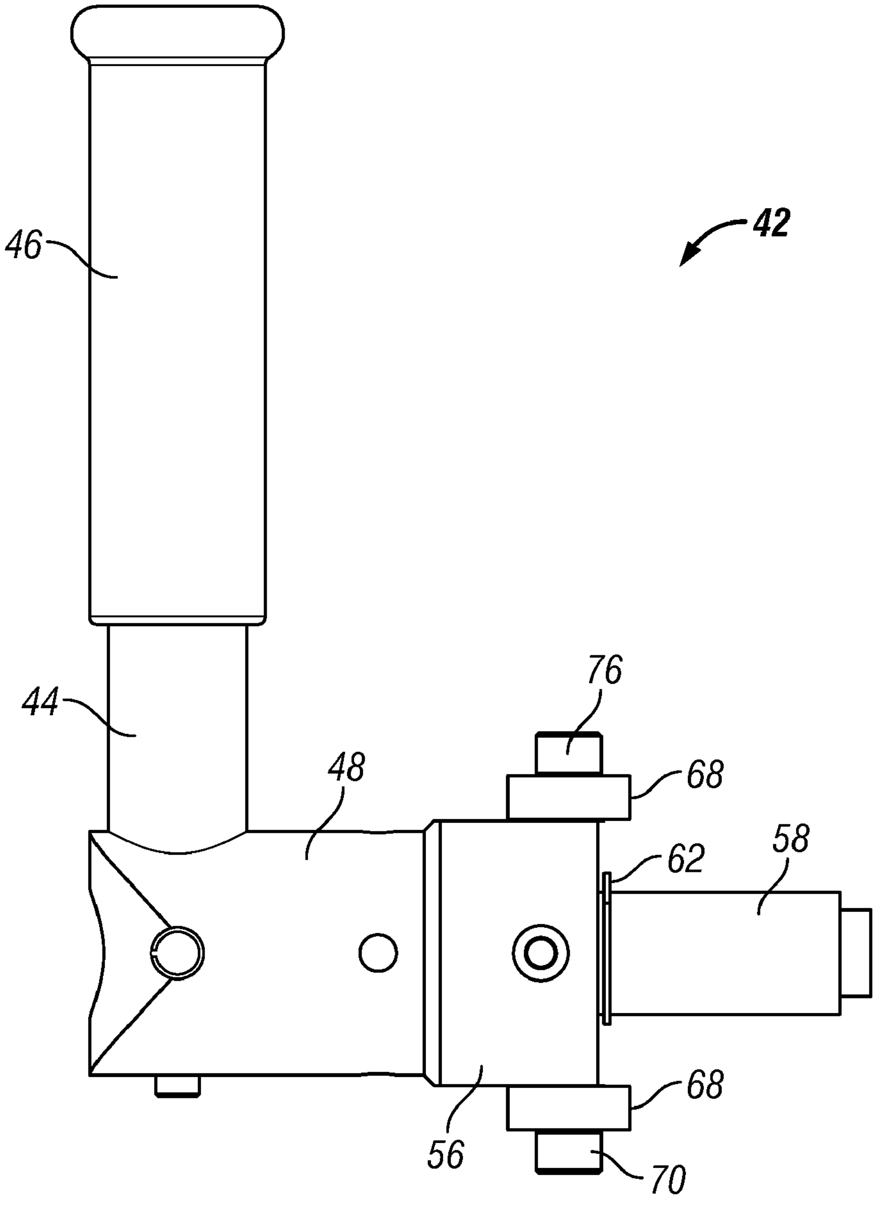
FIG. 11 is an end elevation view of a portion of the joystick module.

The bracket 74 is mounted to a larger mounting bracket 90 via screws 92. The bracket 90 also supports a sensor/valve plate 94 via screws 96. A pair of spring plungers 98 extends through the sensor/valve plate 94 and is retained by nuts 100, as best seen in FIG. 10. An upper cam 102 and a lower cam 104 are pivotally mounted onto the mounting bracket 90 with a bolt 106 and lock nut 108. A pair of spacers 110 space the upper and lower cams 102, 104 from the mounting bracket 90, with the bolt 106 extending through the spacers 110. Appropriate washers 112 may also be provided on the bolt 106. The upper and lower cams 102, 104 are pivotal about the bolt 106, The cams 102, 104 transfer motion of the joystick assembly 42 through the bearings 68 to the sensor/valve mounted to plate 94.

Figure 13:
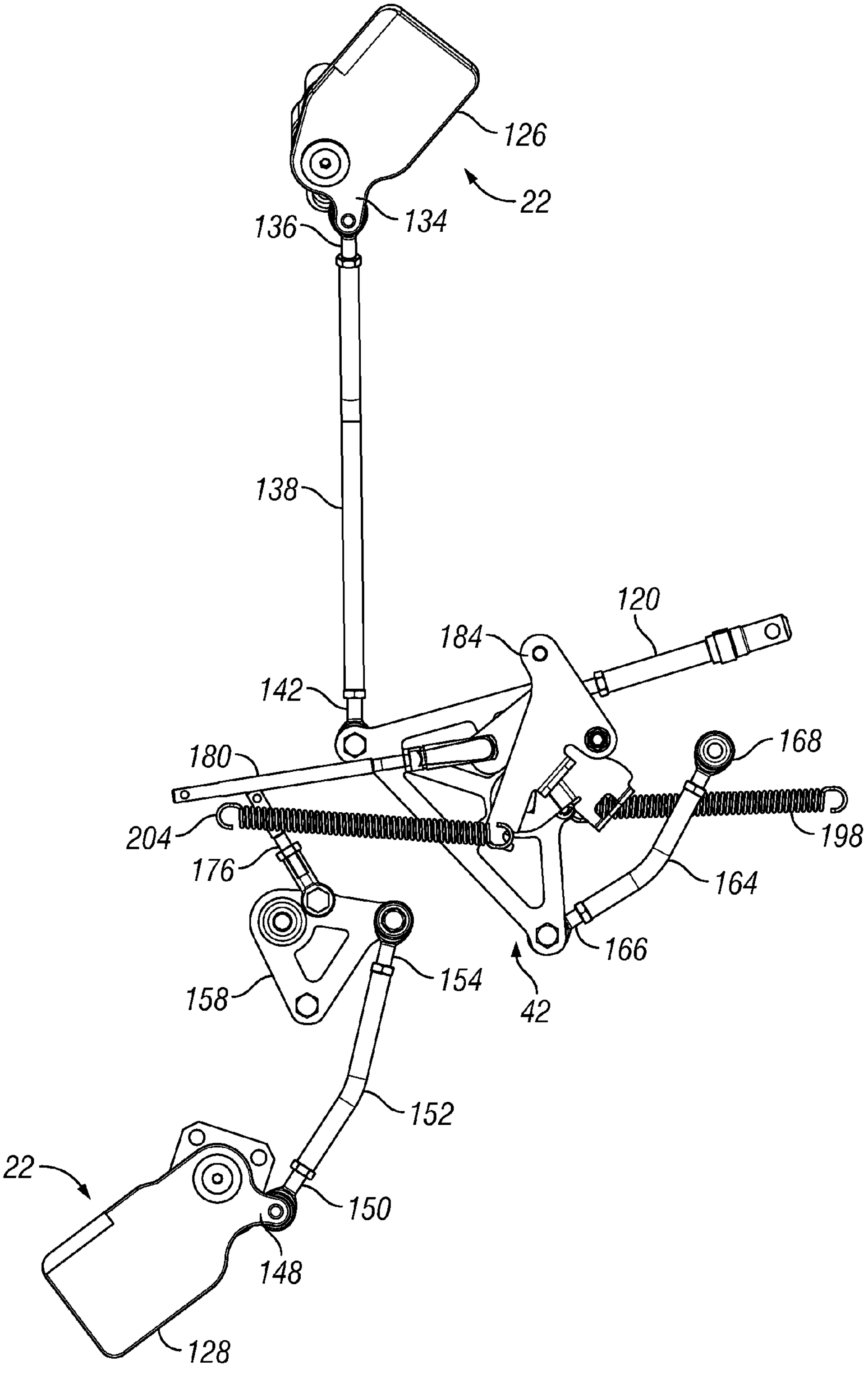
FIG. 13 is a front elevation view of the blast lock module for use with an electronic door actuator or other device with electric inputs.
Figure 14:
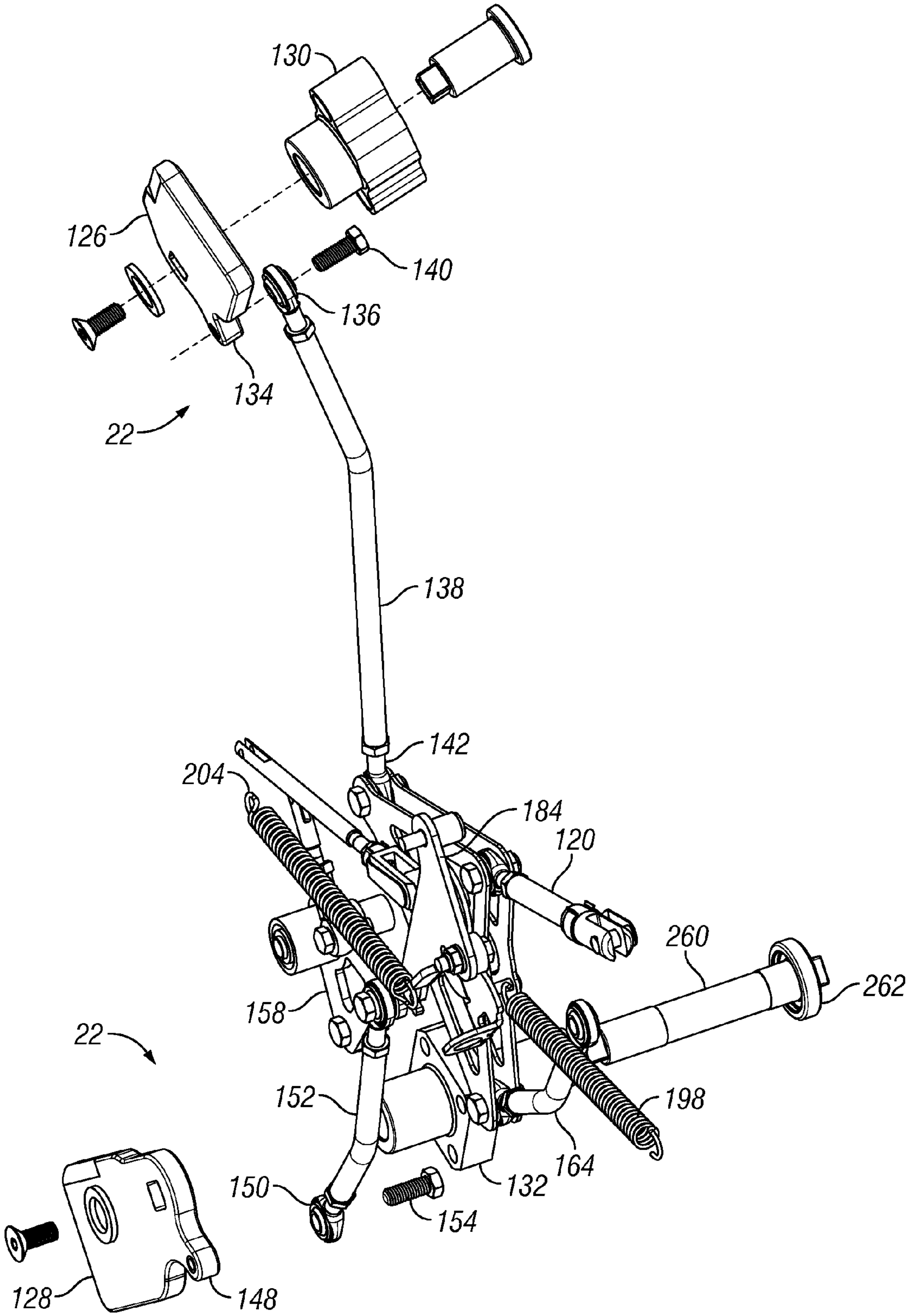
FIG. 14 is a partially exploded view of the blast lock module of the blast lock module shown in FIG. 13.
Figure 15:
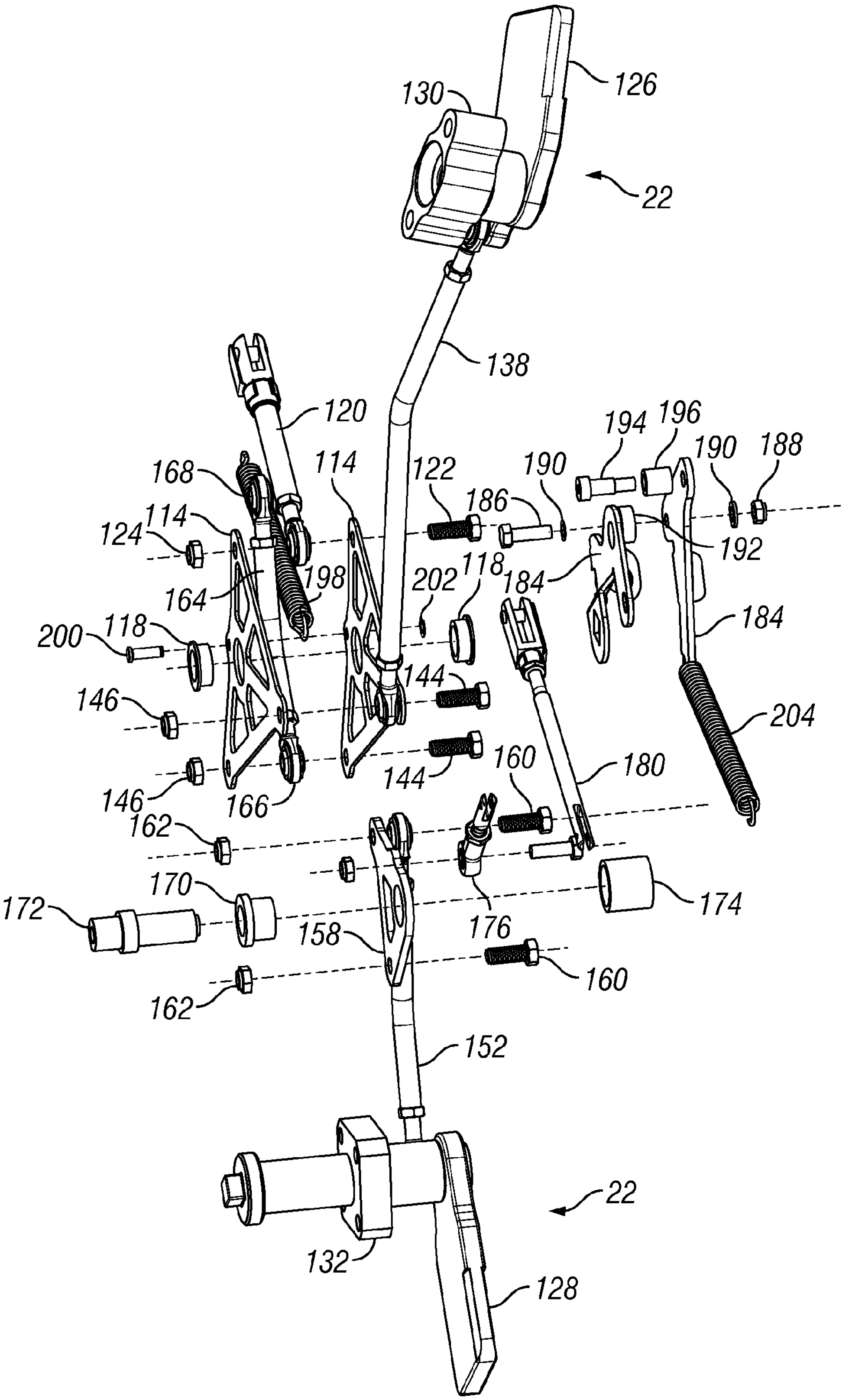
FIG. 15 is another exploded view of the blast lock module of the blast lock module shown in FIG. 13.
Figure 16:
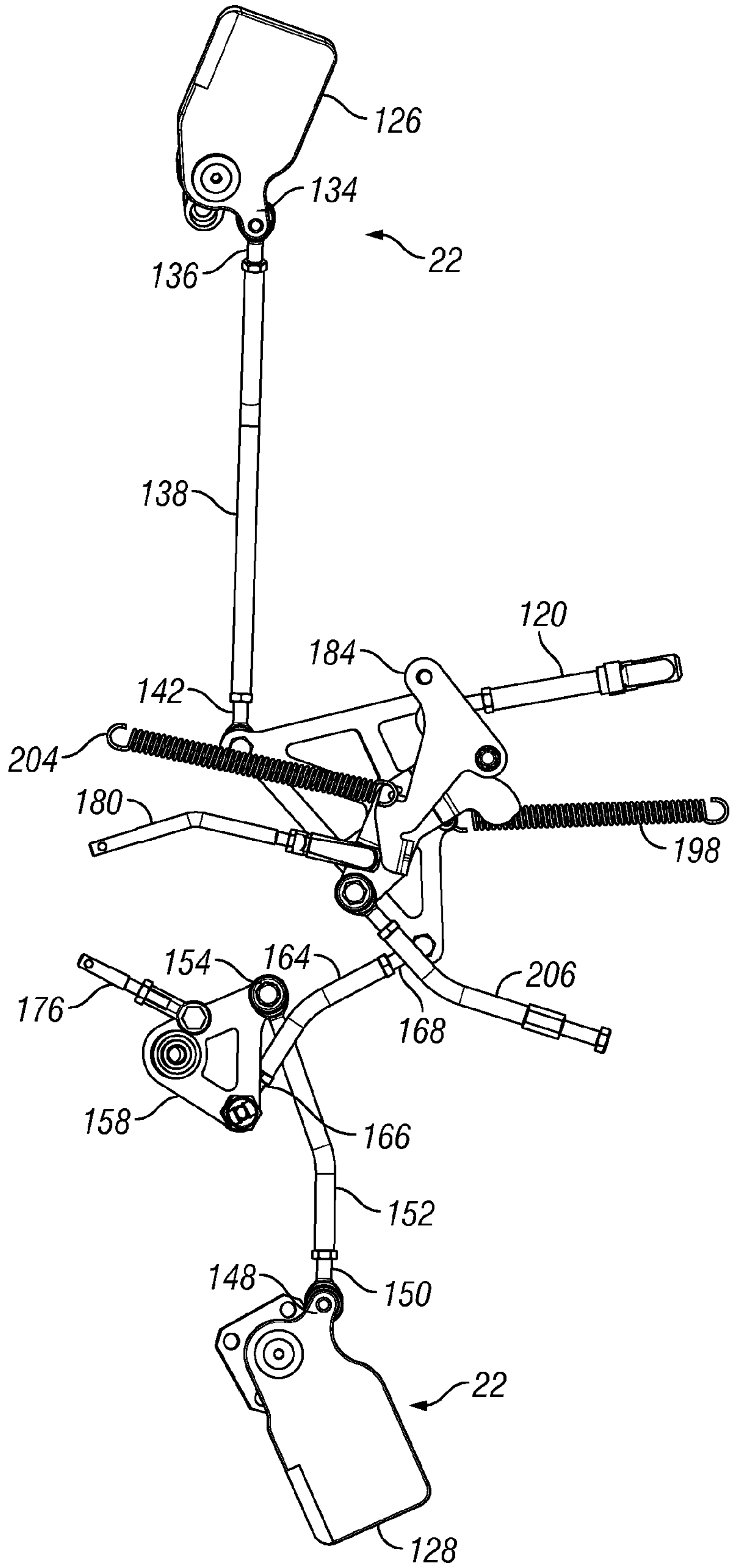
FIG. 16 is a front elevation view of a blast lock module for use with a pneumatic door actuator or other device with valve type inputs.
Figure 17:
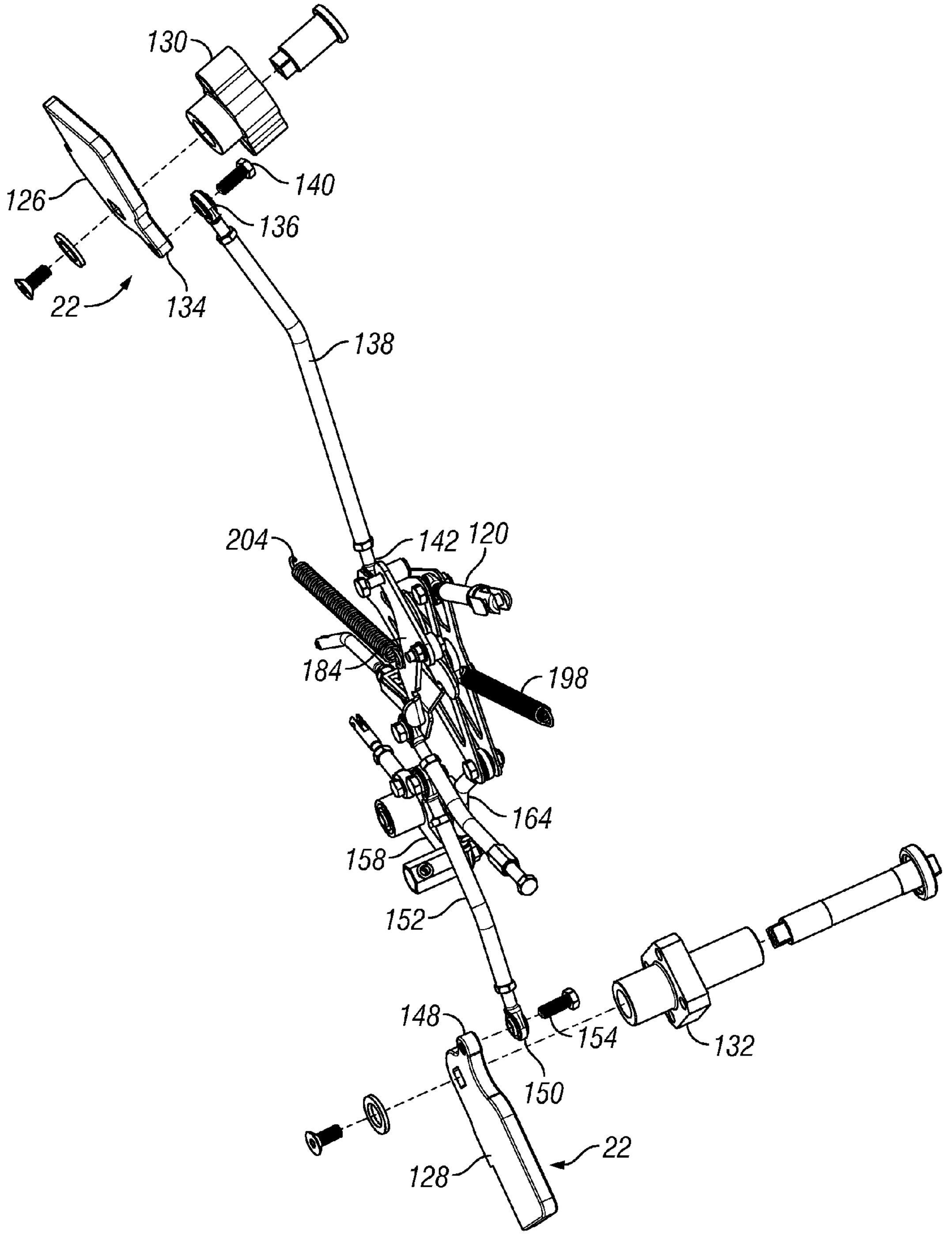
FIG. 17 is a partially exploded view of the blast lock module shown in FIG. 16.
Figure 18:
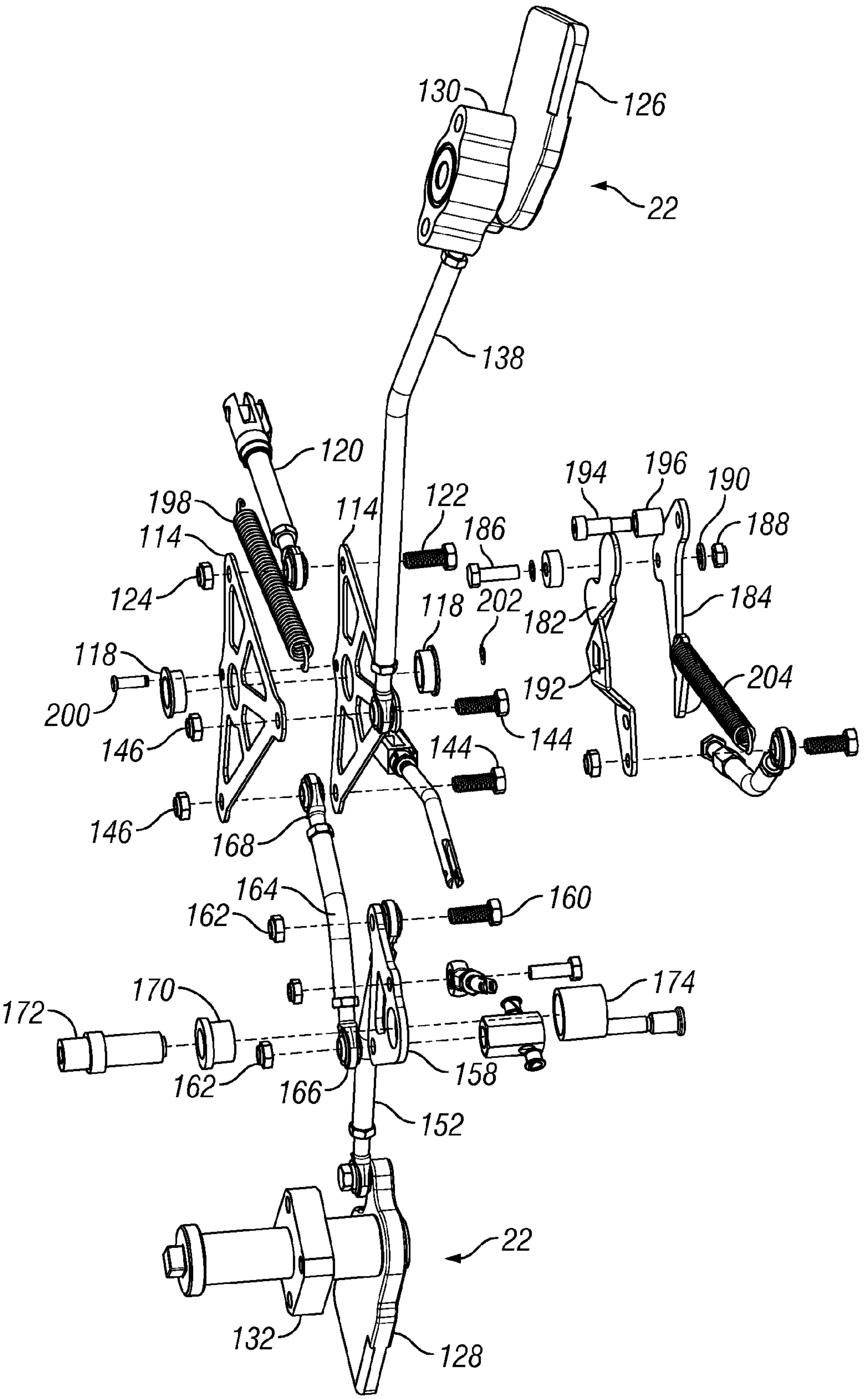
FIG. 18 is another exploded view of the blast lock module shown in FIG. 16.

The linkage assembly 42 is best shown in FIGS. 13-18, and varies slightly depending upon the type of power assist unit 18 being used in the door 12. The linkage 42 for an electrical power assist unit 18 is shown in FIGS. 13-15, while the linkage 42 for a pneumatic power assist unit 18 is shown in FIGS. 16-18. Common components for the linkage assembly 42 will use the same reference numerals throughout FIGS. 13-18.

The linkage assembly 42 includes a pair of triangular link plates 114 each of which is pivotally mounted on the end of a sleeve 116 of the exterior handle lever 34 via bushings 118. A rod 120 has a first end secured between the plates 114 by a bolt 122 and nut 124. The opposite end of the rod 120 is connected to the joystick module cam arm 86 as shown in FIG. 10.

The blast lock assembly 22 includes upper and lower blast plates 126, 128. The upper blast plate 126 is connected to a mounting block 130, and the lower blast plate 128 is connected to a lower mounting block 132. The blocks 130, 132 are fixed to the door so that the plates 126, 128 are pivotal between locked and unlocked positions relative to the door frame. Rotation of the blast plates 126, 128 is controlled by link arms. More particularly, the upper blast plate 126 has a leg connected to the upper end 136 of an upper link arm 138 via a bolt 140. The lower end 142 of the upper link arm 138 is connected between the link plates 114 with a bolt 144 and nut 146. Similarly, the lower blast plate 128 has a leg 148 connected to the lower end of a link arm 152 via a bolt 154. The upper end 154 of the lower link arm 152 is connected to a plate 158 via a bolt 160 and nut 162. An intermediate link arm has a lower end 166 connected to the plate 158 by a bolt 160 and nut 162, with the upper end 168 of the middle link arm 164 being connected between the link plates 114 via a bolt 144 and nut 146. Thus, the ends of the rod 120, upper link arm 138 and middle link arm 164 are connected to respective apexes or corners of the triangular link plates 114.

The lower plate 158 has an opening through which a bushing 170 and shaft 172 extends, with a spacer 174 mounted on the bushing 170. A trip lever rod 176 has one end fixed to the plate 158 by a bolt 160 and nut 162. The opposite end of the trip lever rod 176 is connected to a trip lever 218 (FIG. 19).

Figure 19:
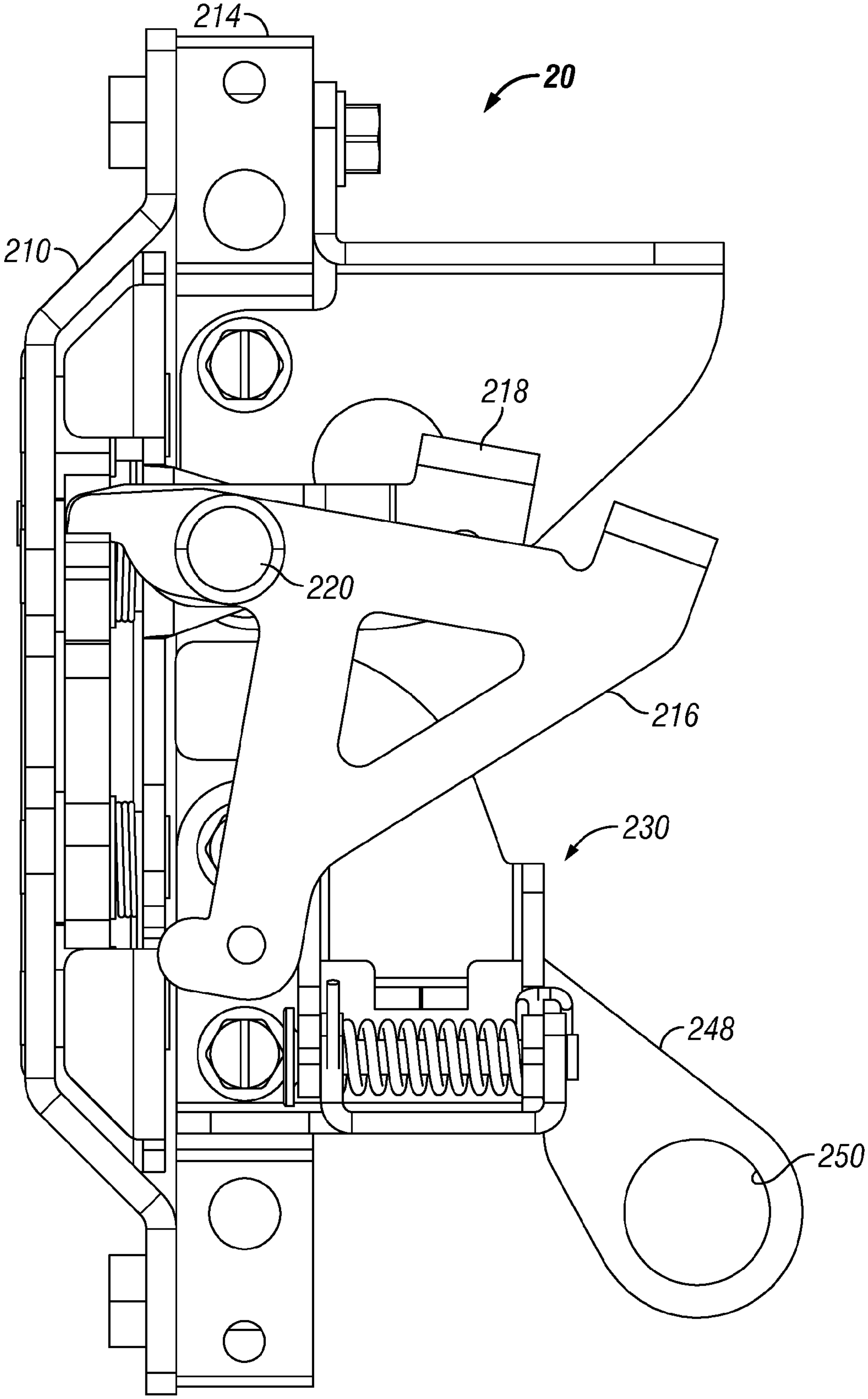
FIG. 19 is a top elevation view of the latch module for use with an electronic door actuator or other device with electronic inputs

The linkage assembly 42 also includes a rod 180 having a clevis end connected to a guide bracket 182, and an opposite end connected to a trip lever 216 as shown in FIG. 19. As best seen in FIG. 15, a bearing mount arm 184 is secured to the guide bracket 182 by a bolt 186, lock nut 188, and appropriate washers 190. The bearing 192 resides between the guide plate 182 and the arm 184. A shoulder bolt 194 with a spacer 196 is also mounted on the arm 184.

Figure 2:
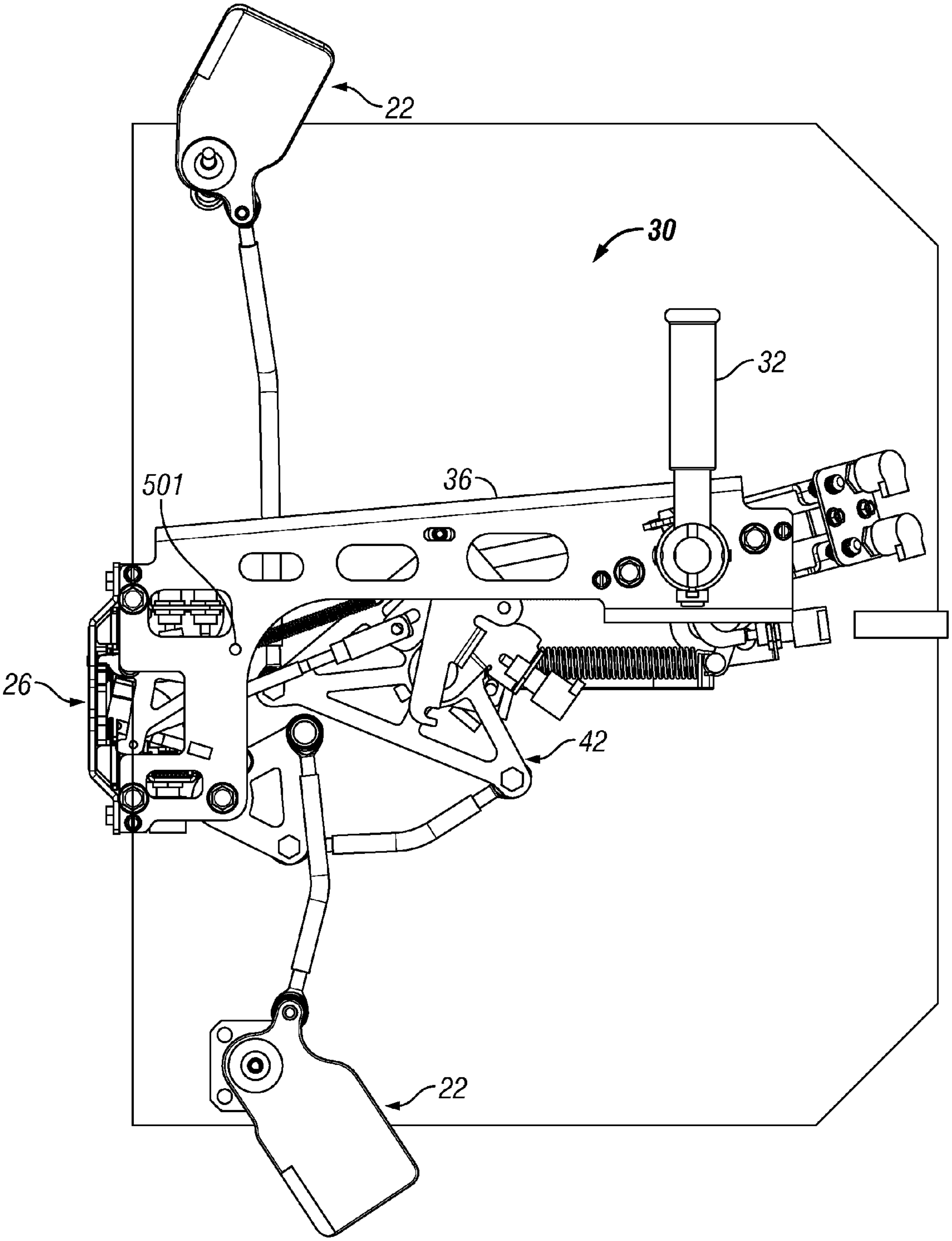
FIG. 2 is an inside elevation view of the mechatronic system.
Figure 3:
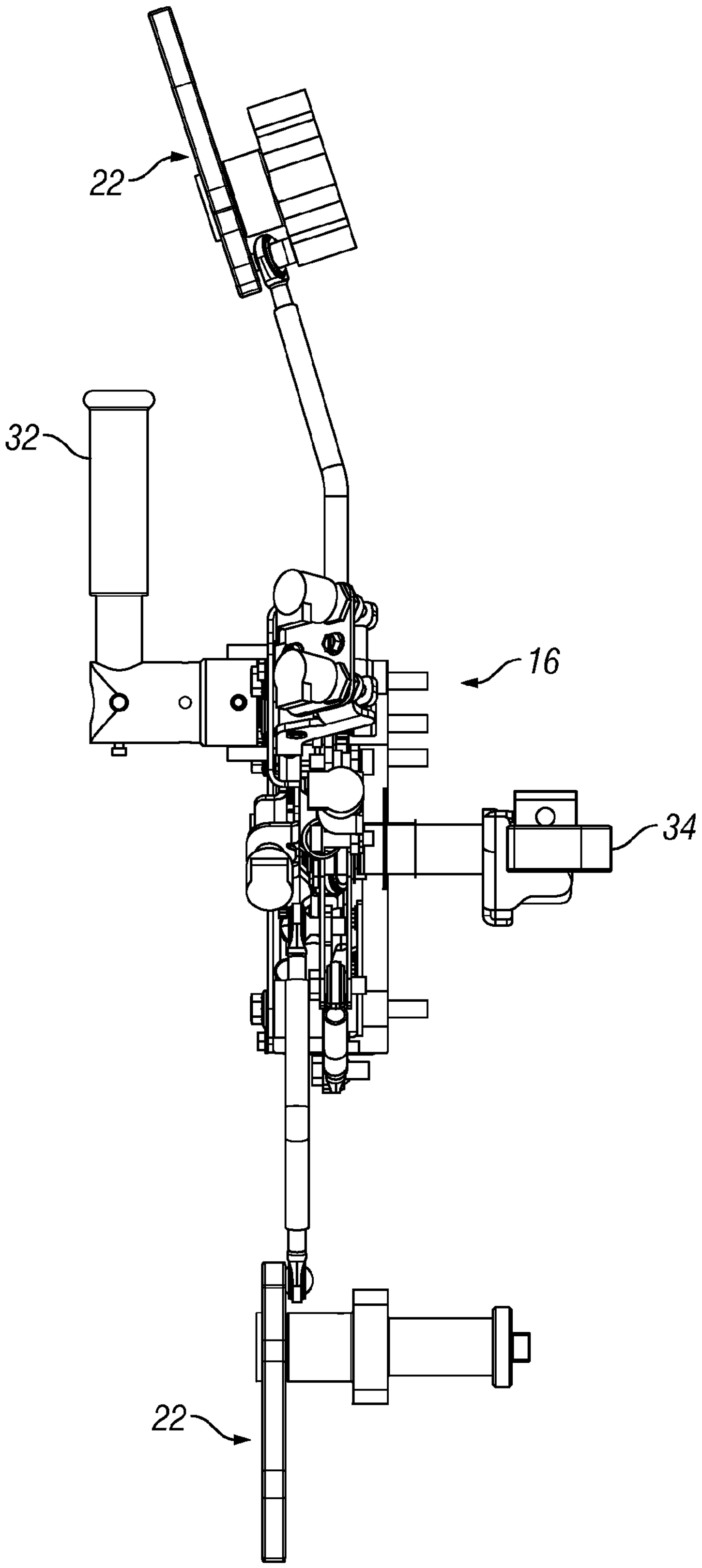
FIG. 3 is an end elevation view of the mechatronic system.
Figure 4:
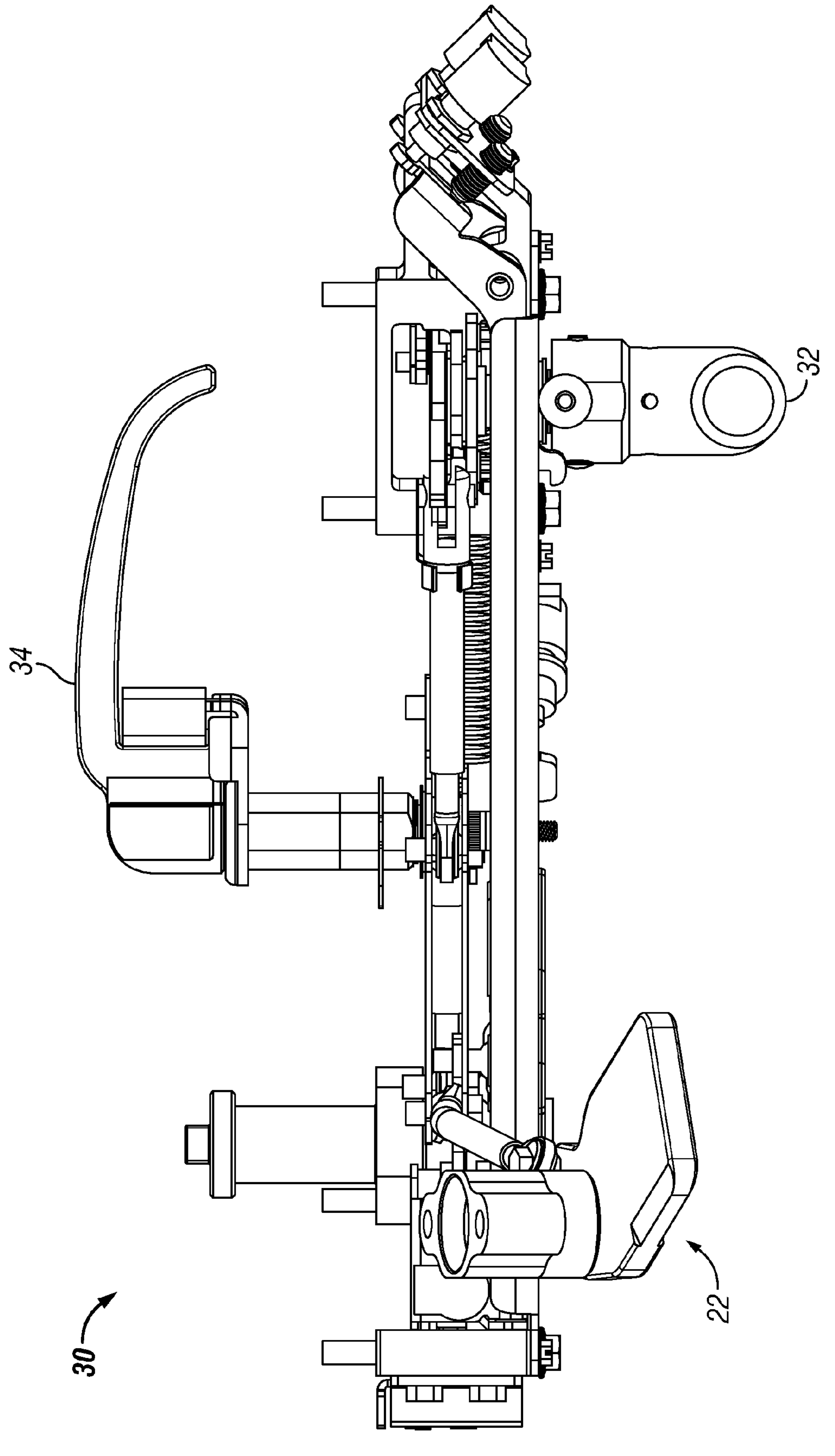
FIG. 4 is a top plan view of the mechatronic system.
Figure 5:
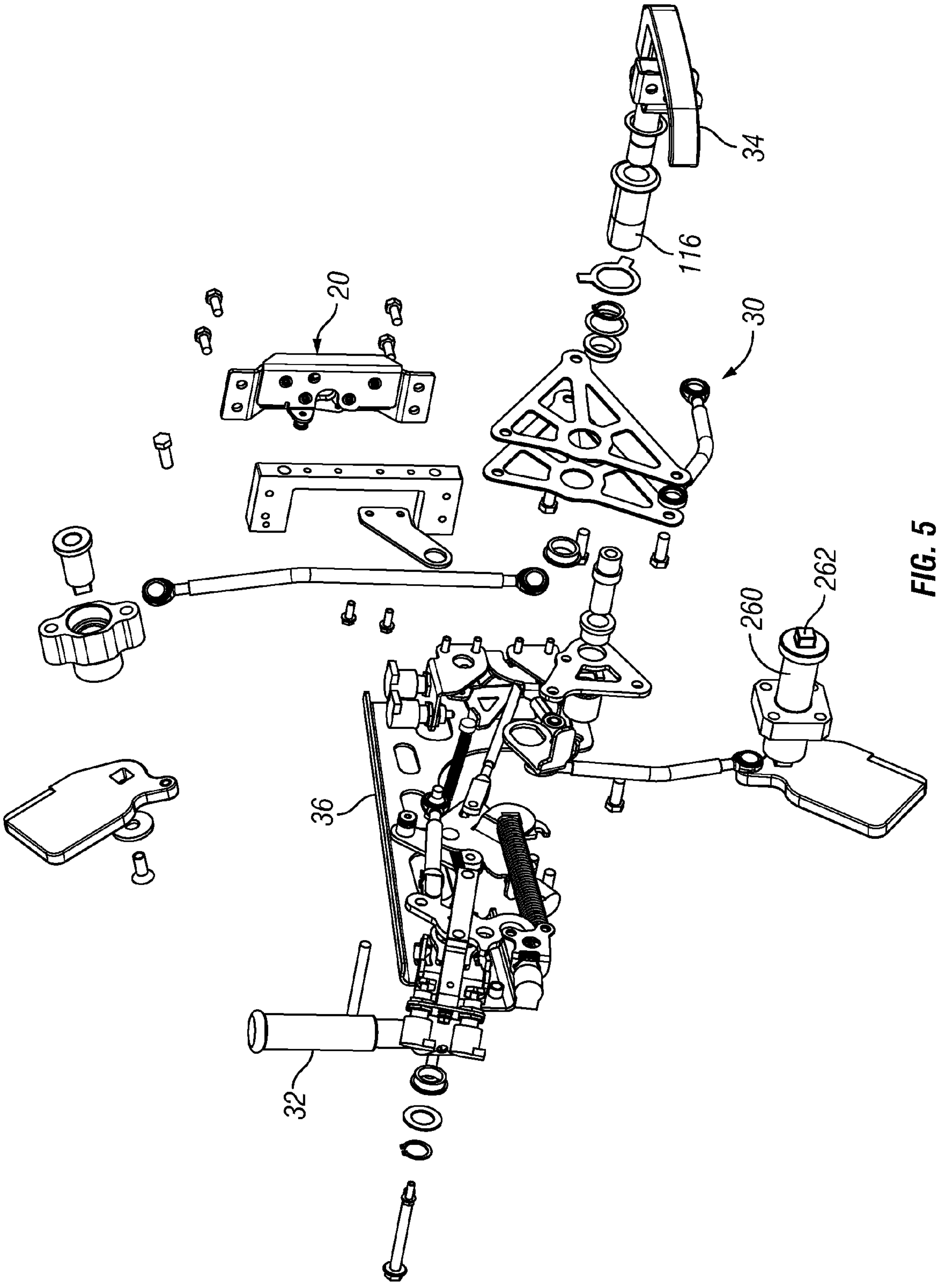
FIG. 5 is an exploded view of the mechatronic system components.

A first spring 198 has one end connected between the link plates 114 by a pin 200, with a C-clip 202 on the pin 200 to preclude the pin from being withdrawn from the plates 114. The opposite end of the spring 198 is connected to a shoulder bolt 500 shown on FIG. 10. A second spring 204 has a first end connected to the bearing arm 184, and a second end connected to the support bracket 36 hole or opening 501, as shown in FIG. 2.

In the link assembly 42 used for the pneumatic power assist unit 18, shown in FIGS. 16-18, the configuration of the guide bracket 182 is modified, as is the rod 180. Also, another link arm 206 is used for the pneumatic power assist unit 18, with one end of the link arm 206 being connected to guide bracket 182, and the other end being connected to a valve or input directly on the power unit.

Figure 20:
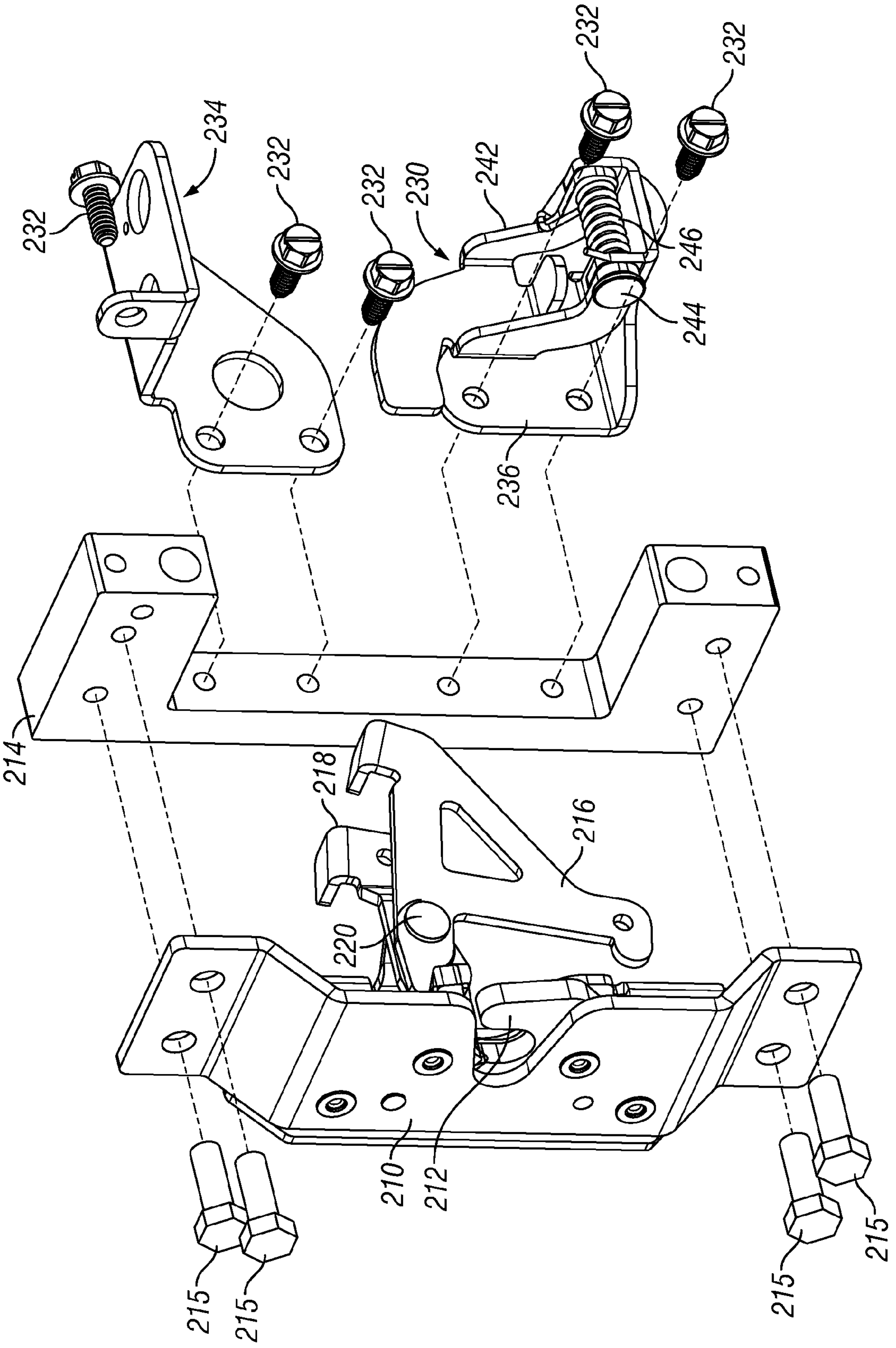
FIG. 20 is an exploded view of the latch module shown in FIG. 19.
Figure 21:
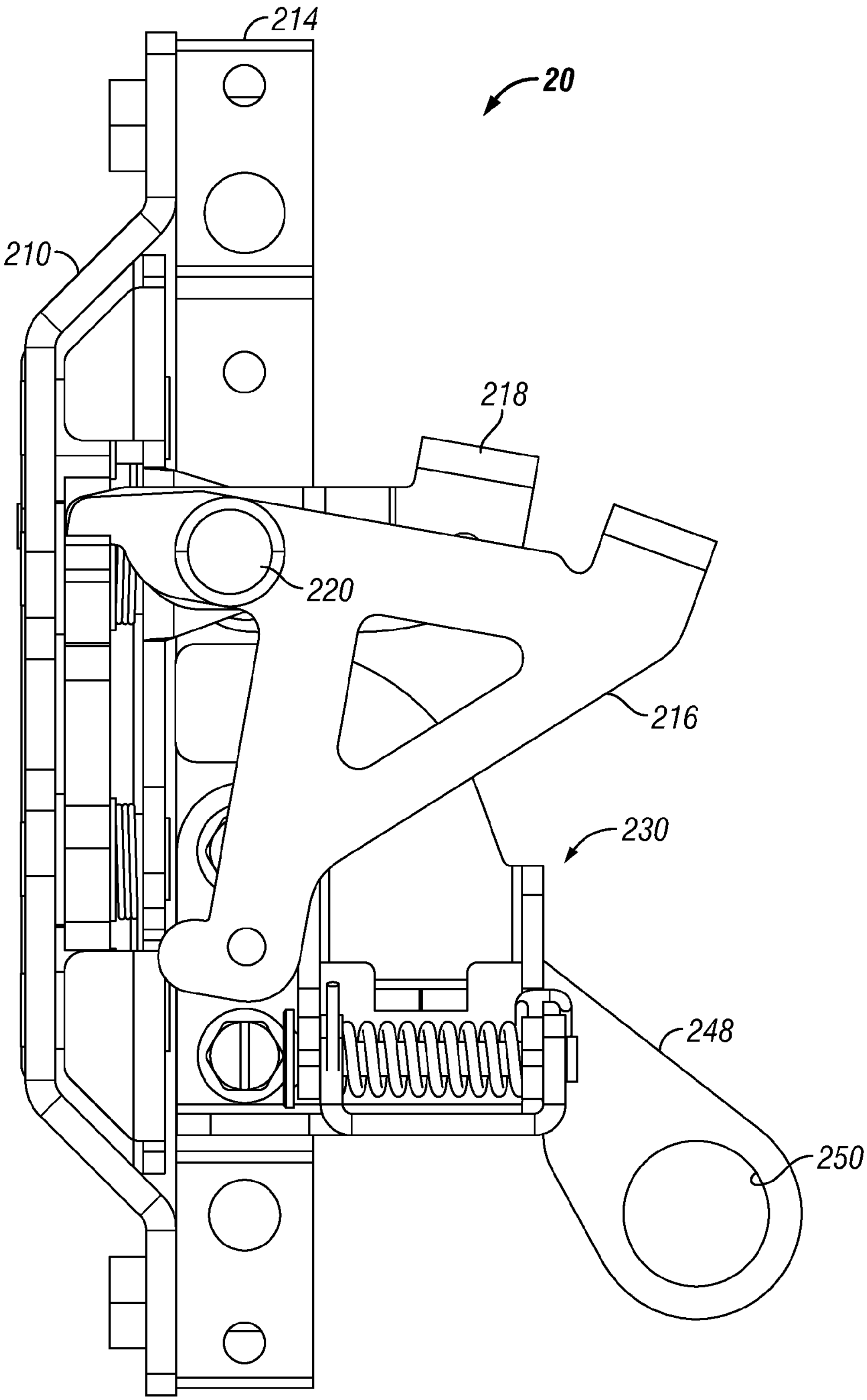
FIG. 21 is an elevation view of a latch module for use with a pneumatic door actuator or other device with valve type inputs.
Figure 22:
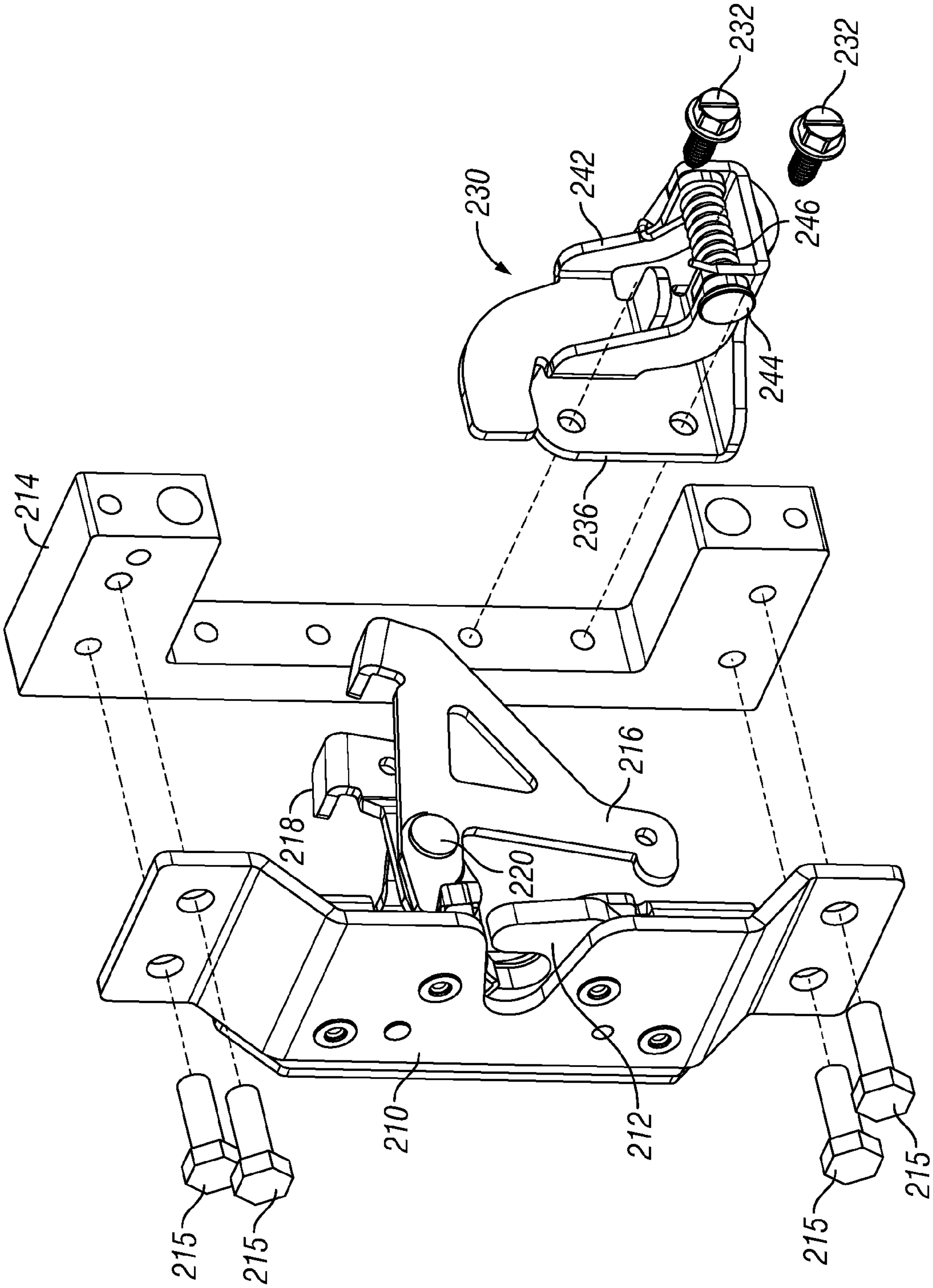
FIG. 22 is a partially exploded view of the latch module shown in FIG. 21.
Figure 23:
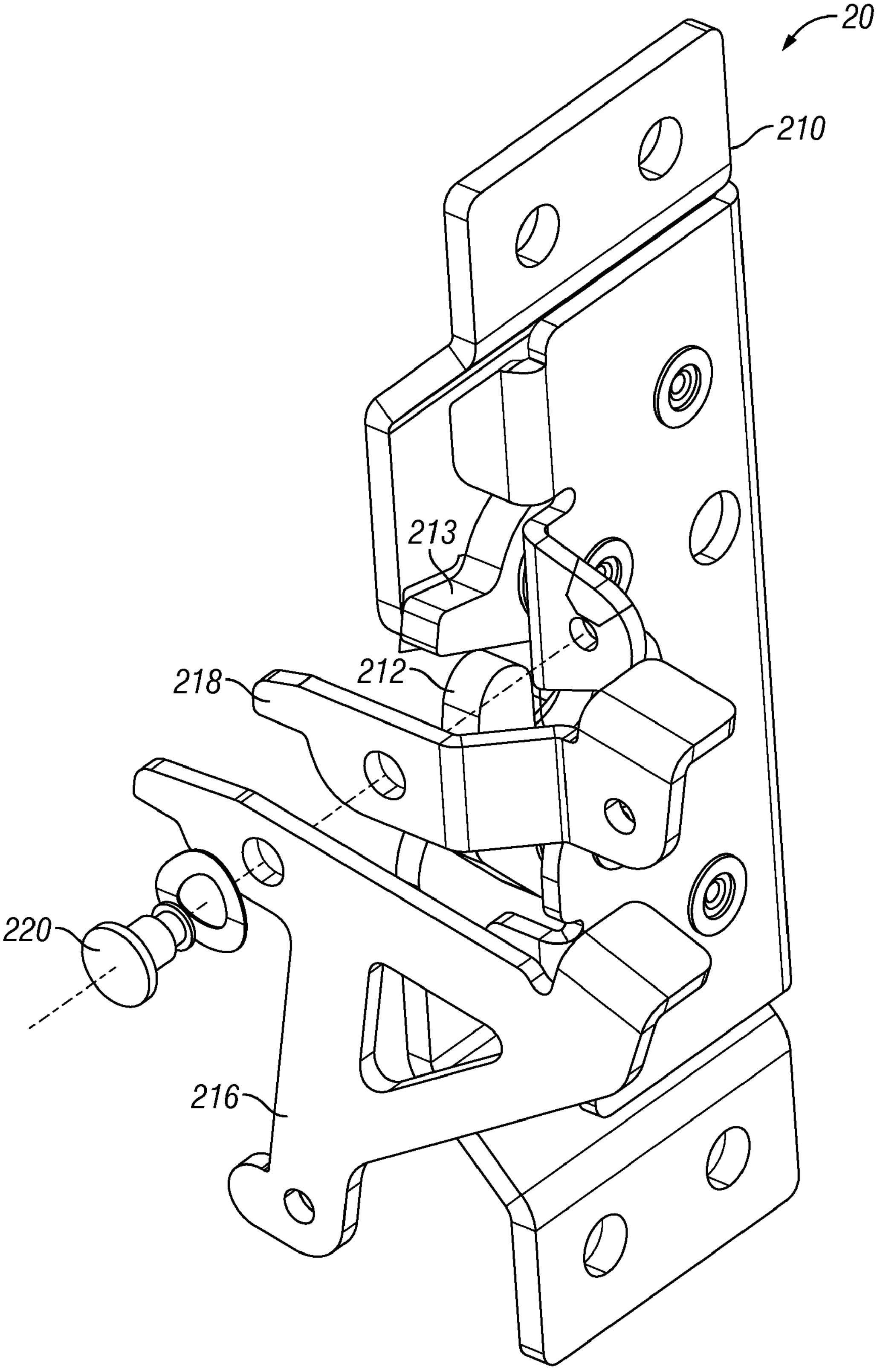
FIG. 23 is a partially exploded perspective view of the latch module.
Figure 24:
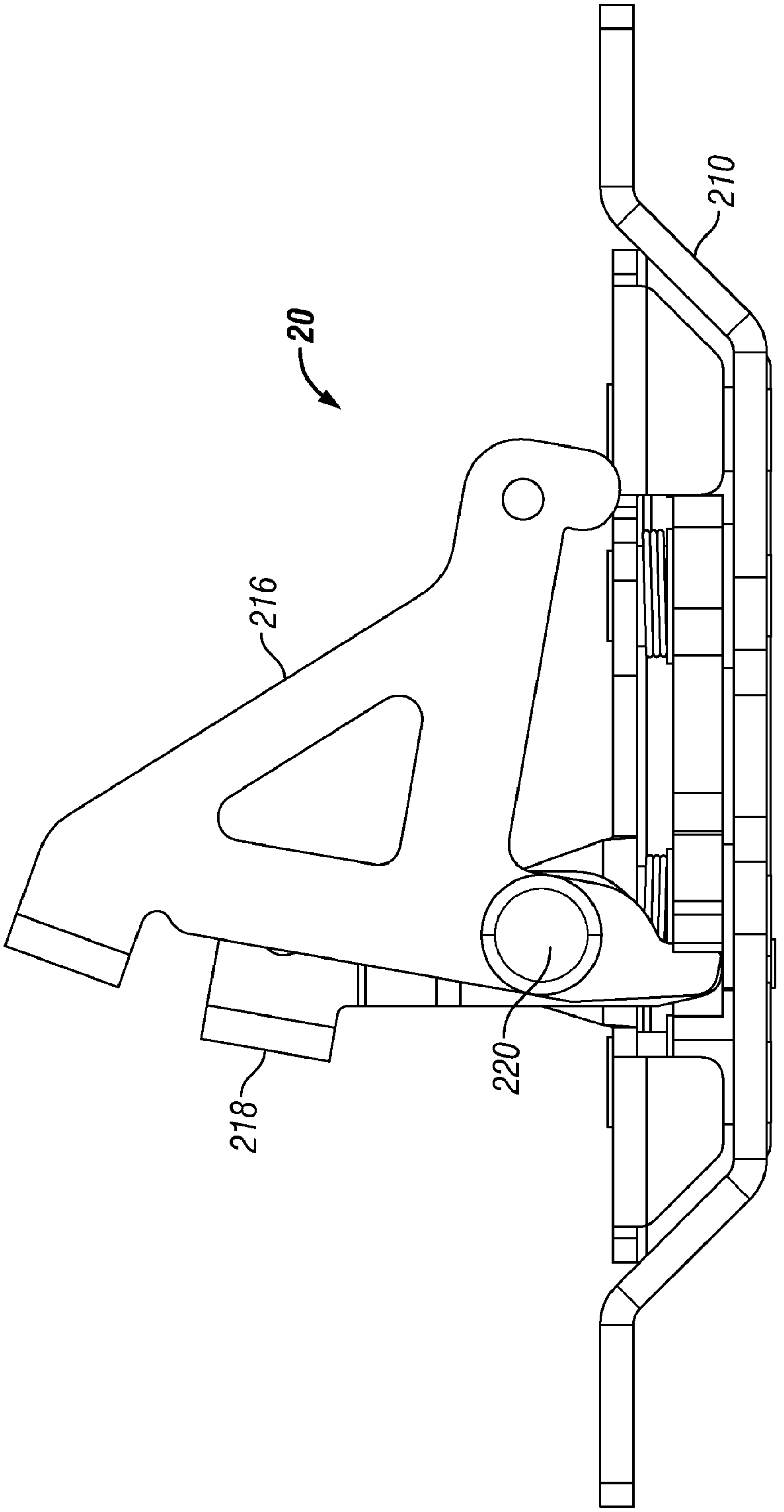
FIG. 24 is an top elevation view of the latch module shown in FIG. 23.
Figure 25:
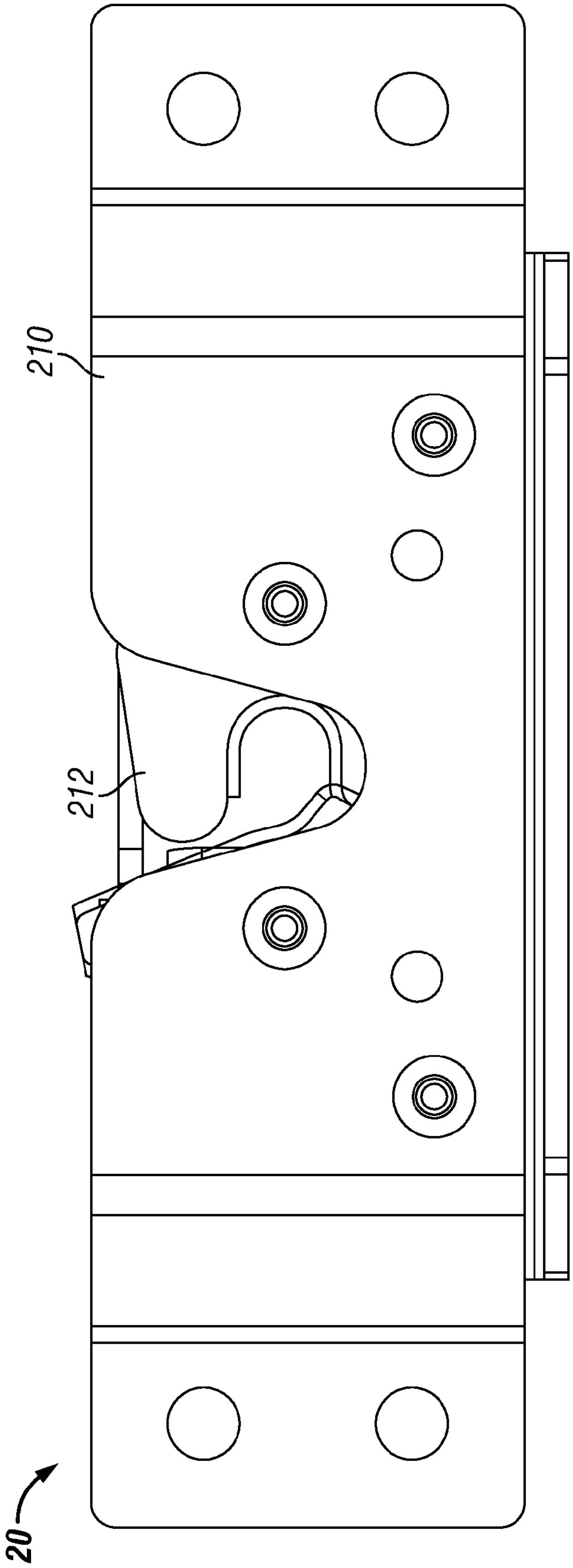
FIG. 25 is a front elevation view of the latch module shown in FIG. 23.
Figure 26:
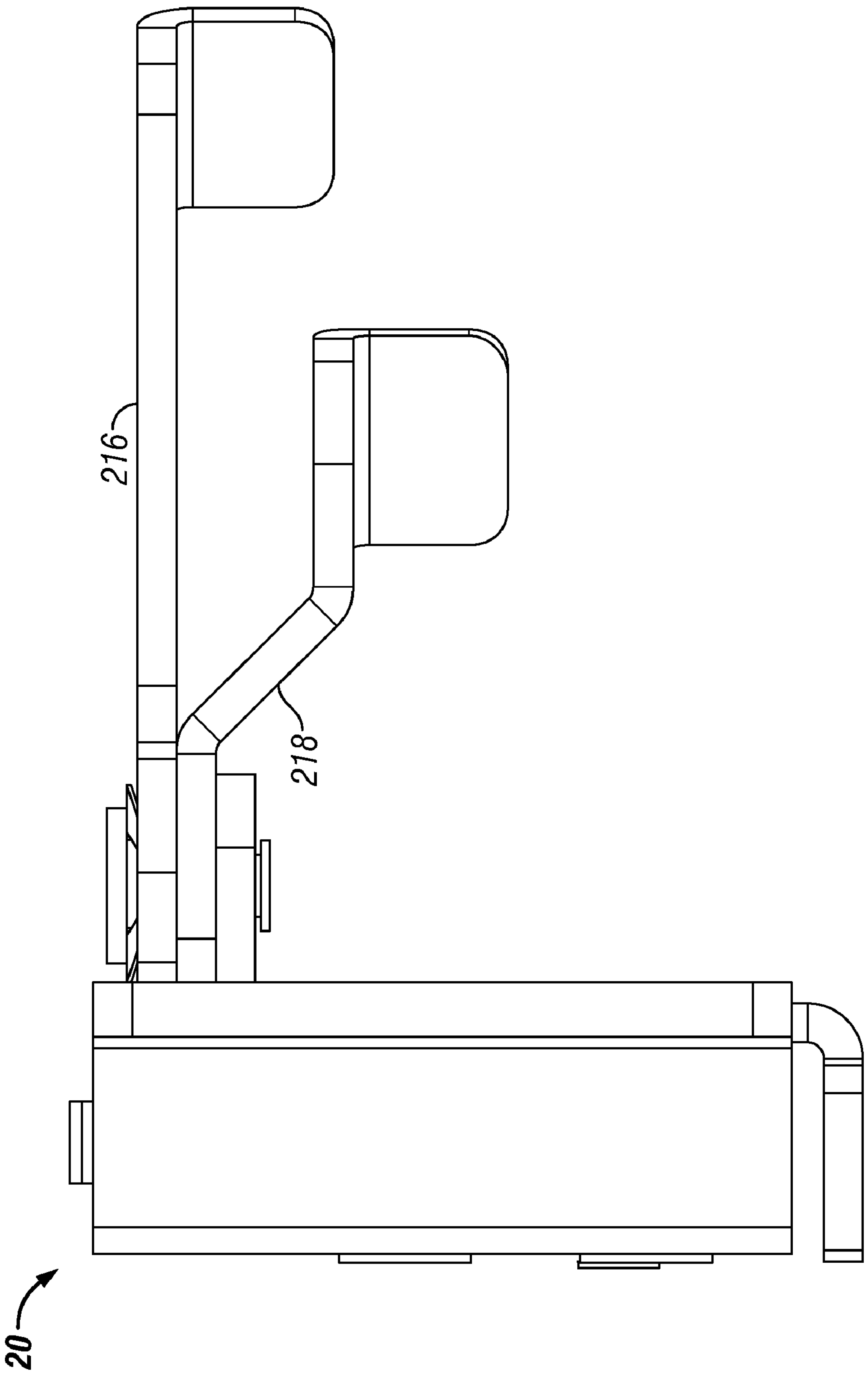
FIG. 26 is a side plan view of the latch module shown in FIG. 23.
Figure 27:
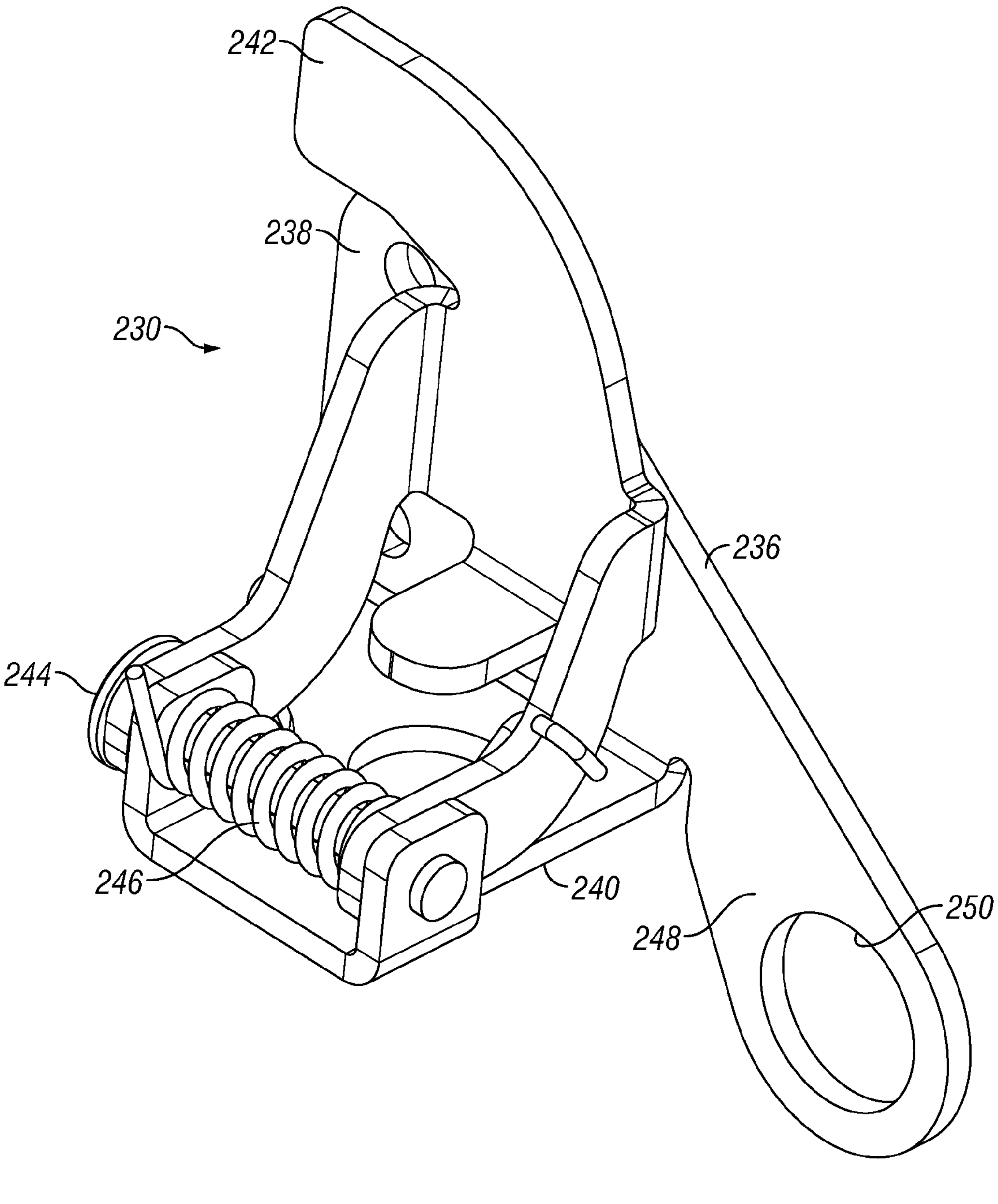
FIG. 27 is a perspective view of the striker position assembly.
Figure 28:
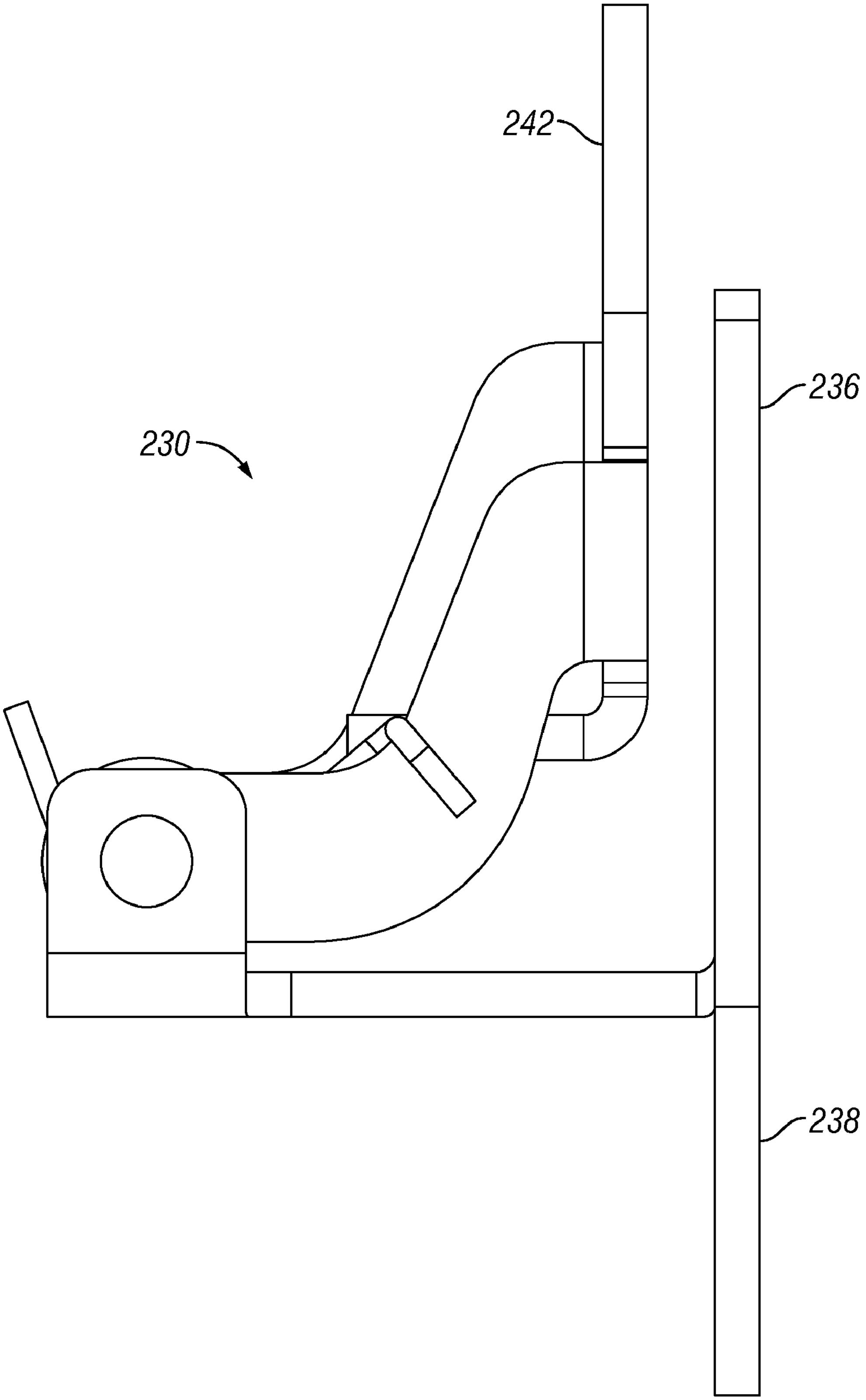
FIG. 28 is a front elevation view of the striker position assembly.
Figure 29:
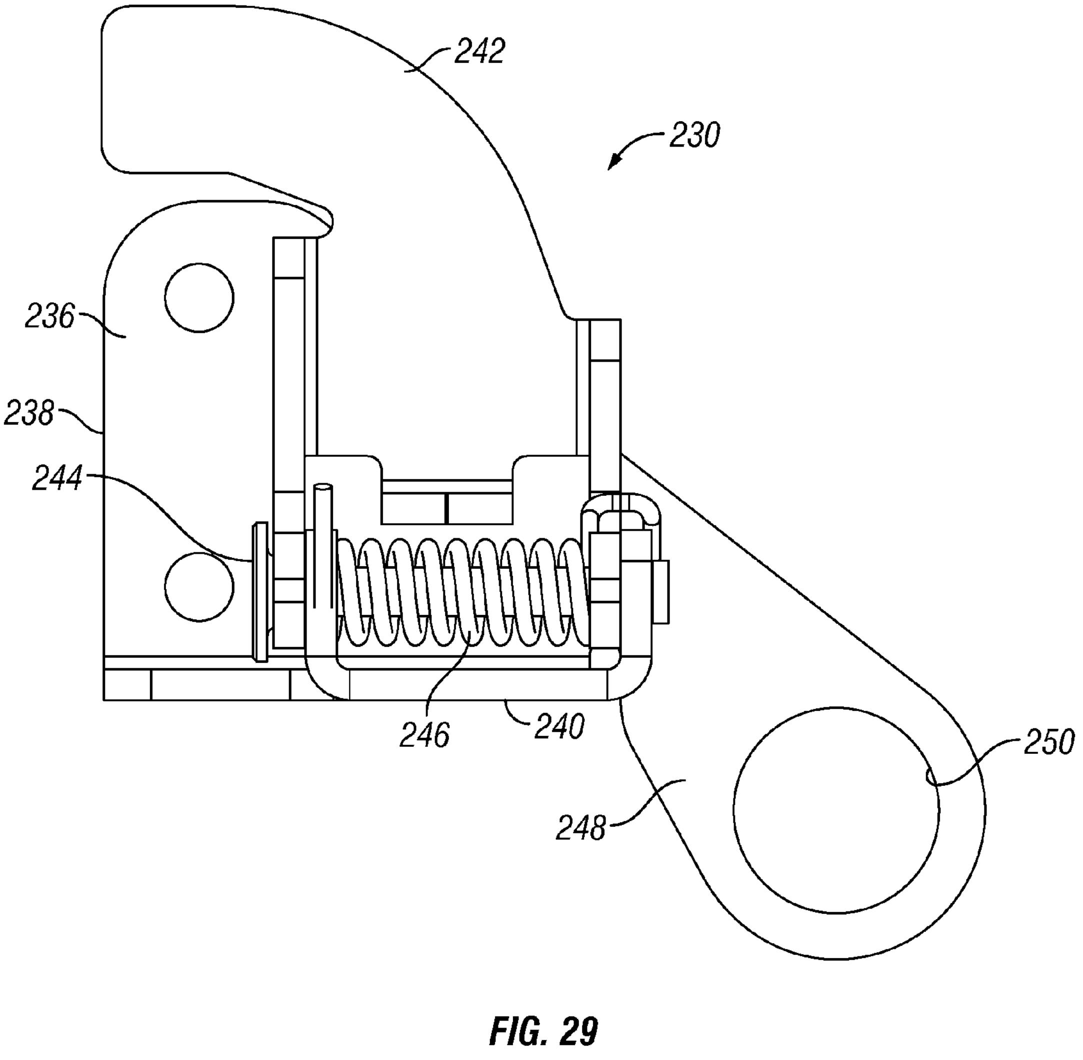
FIG. 29 is a top elevation view of the striker position assembly.
Figure 30:
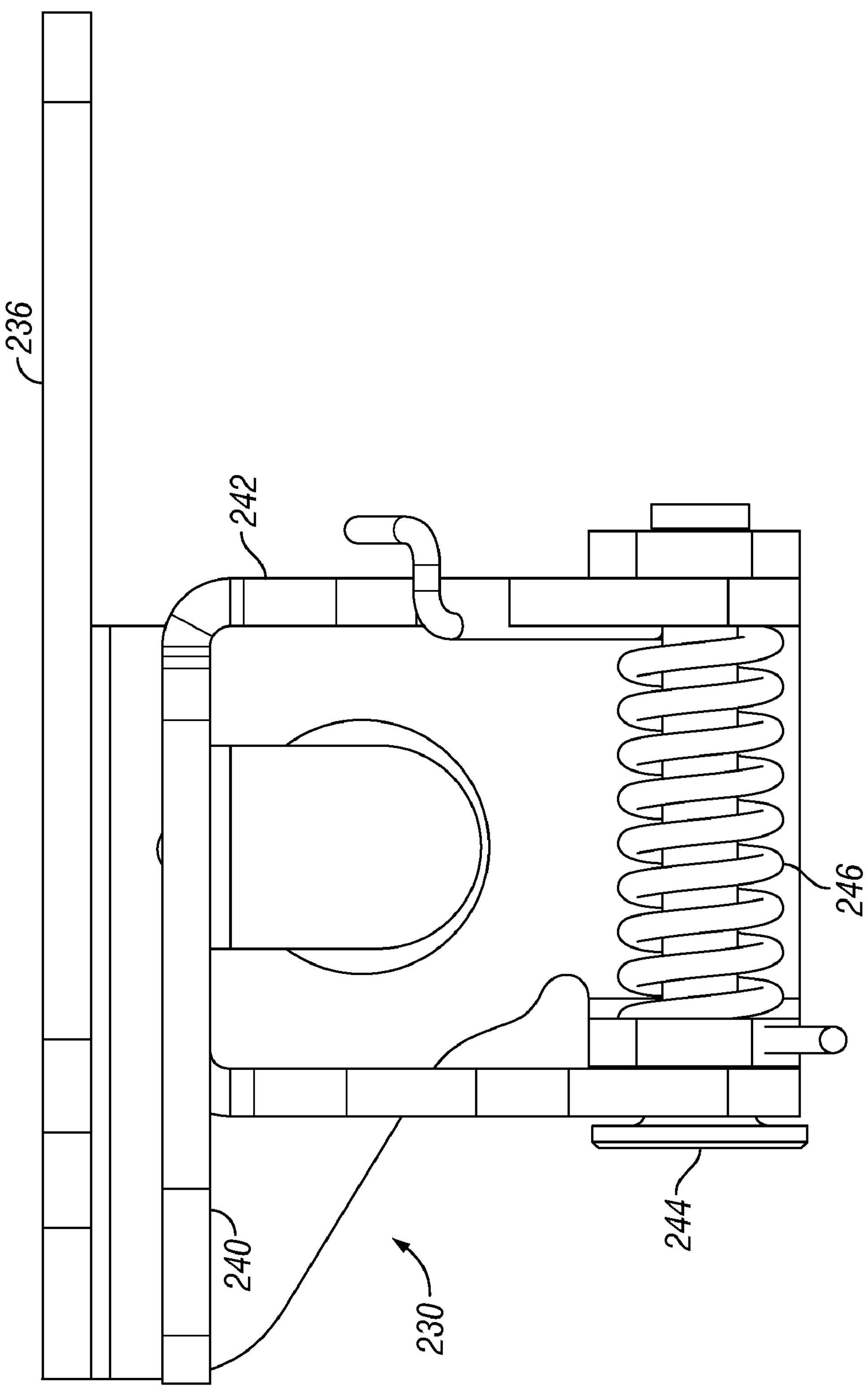
FIG. 30 is a side plan view of the striker.
Figure 31:
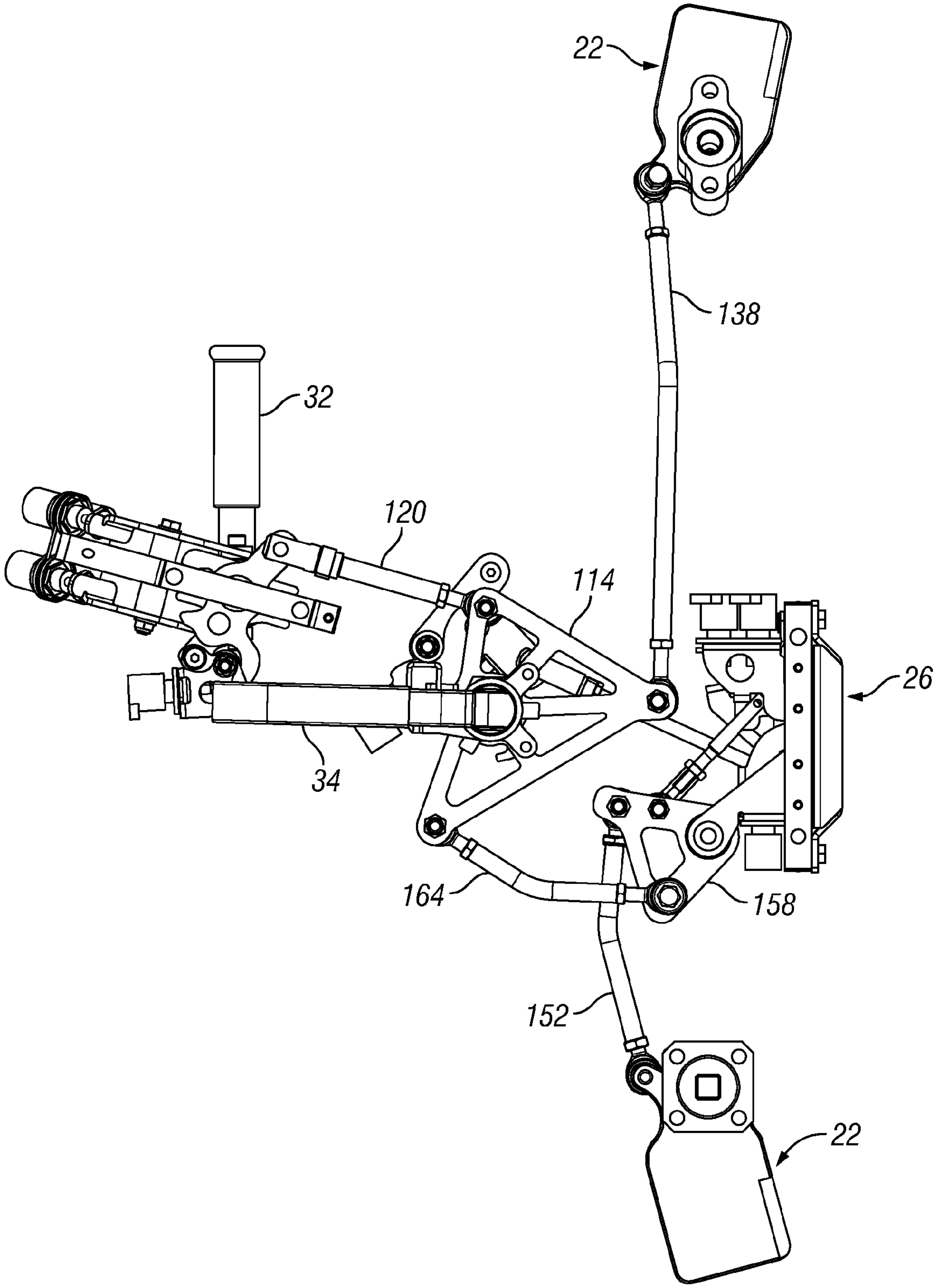
FIGS. 31-33 show the interior handle in the neutral, close and open positions, respectively.
Figure 32:
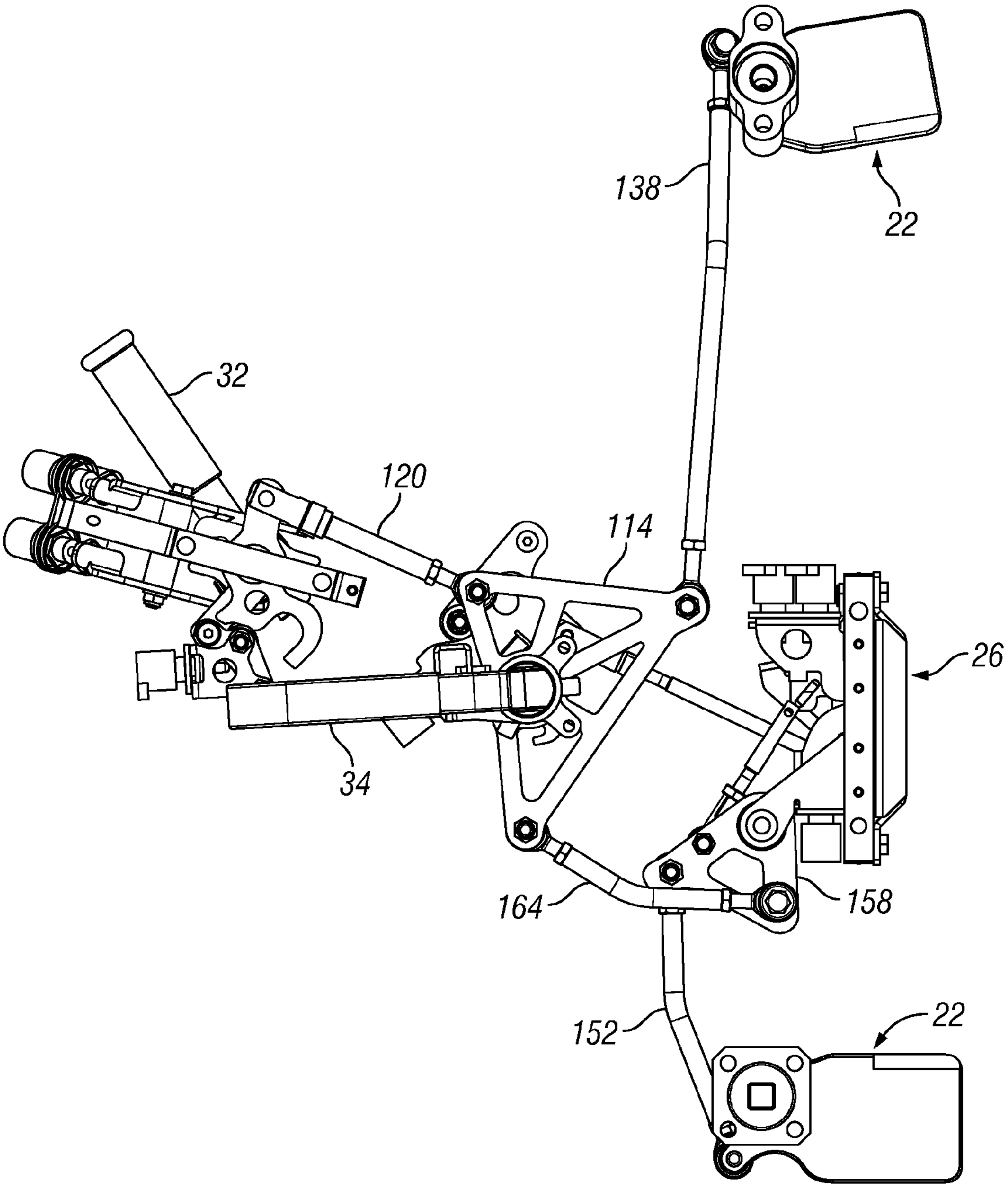
Figure 33:
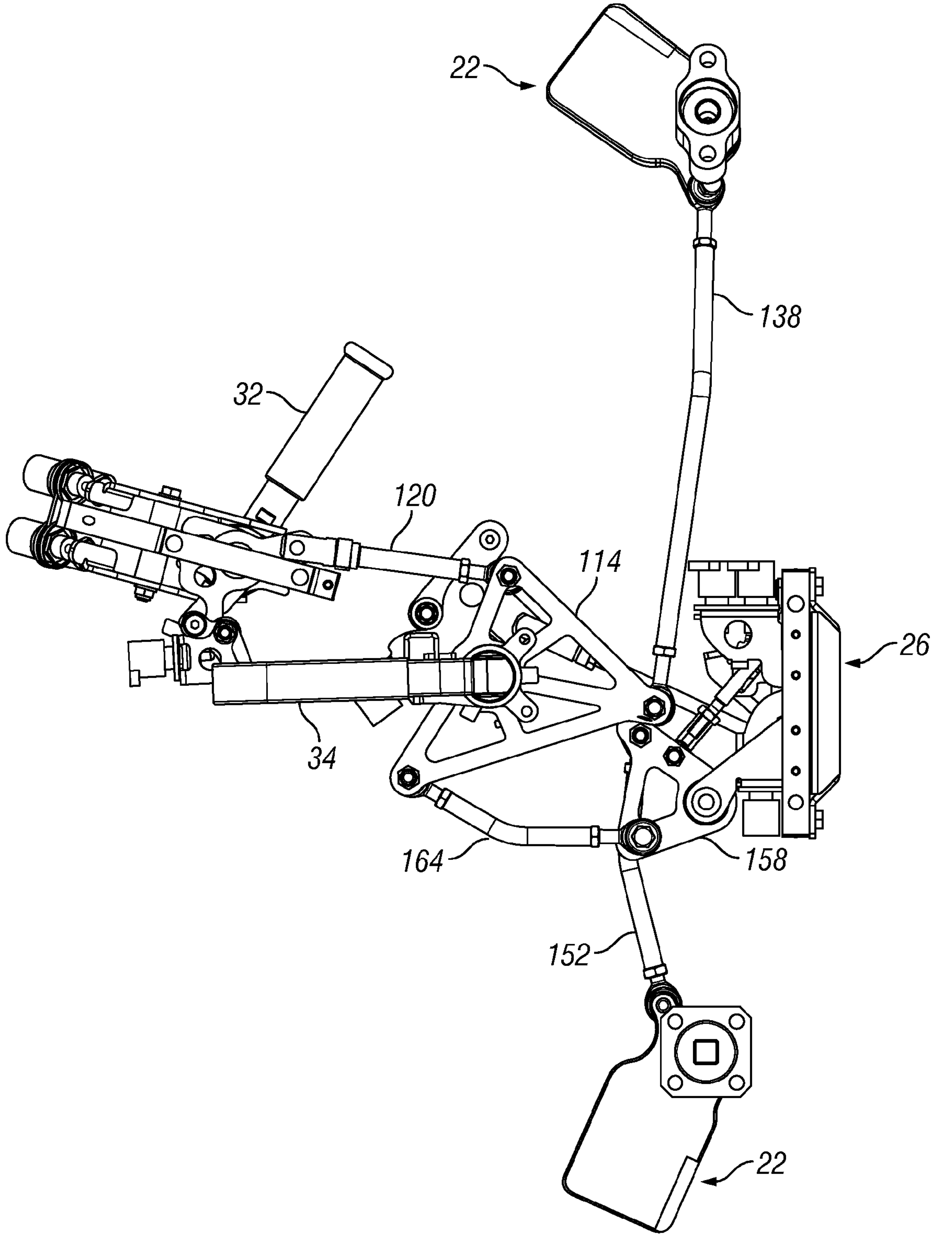
Figure 34:
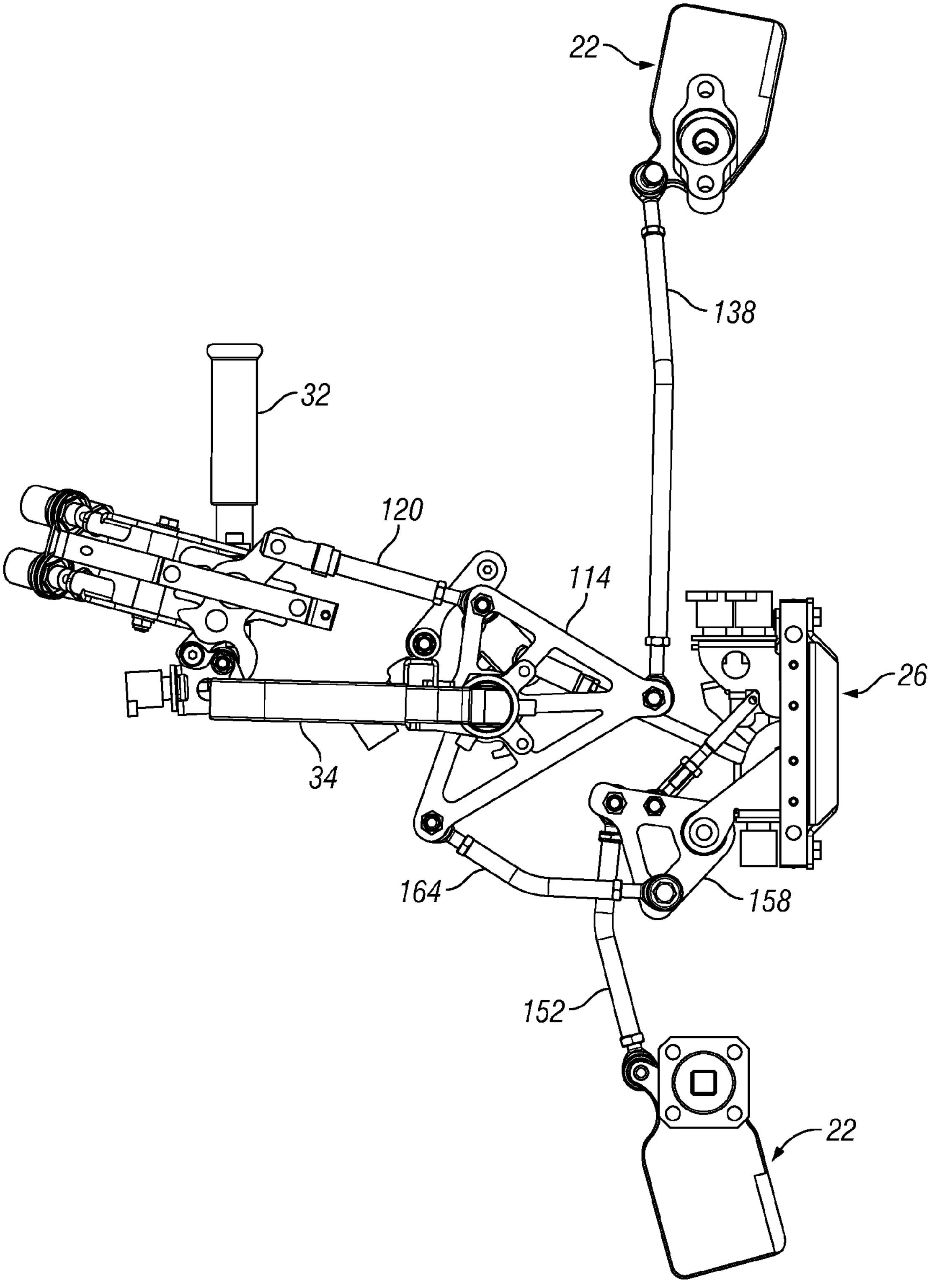
FIGS. 34-36 show the exterior handle in the neutral, open and close positions, respectively.
Figure 35:
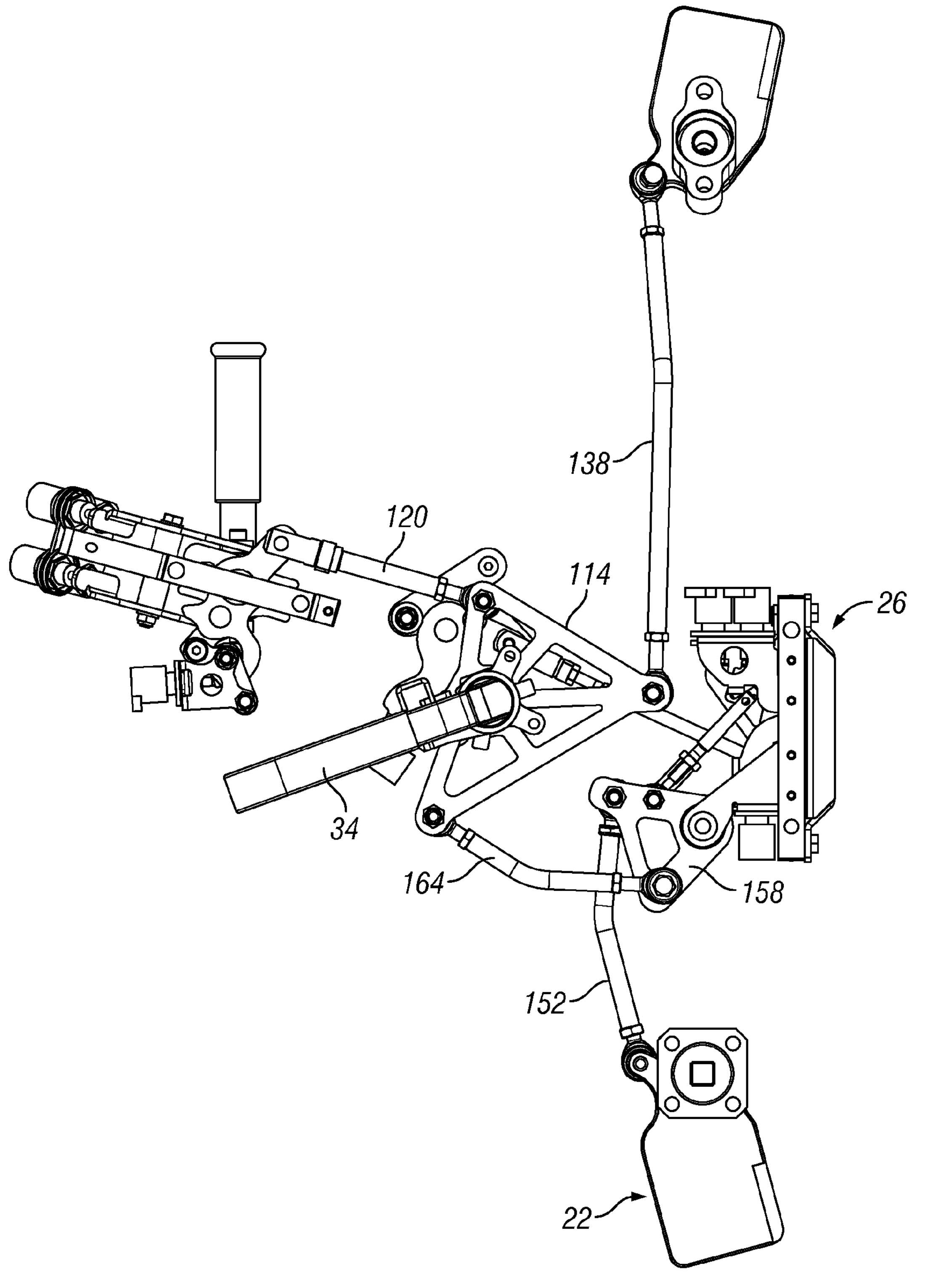
Figure 36:
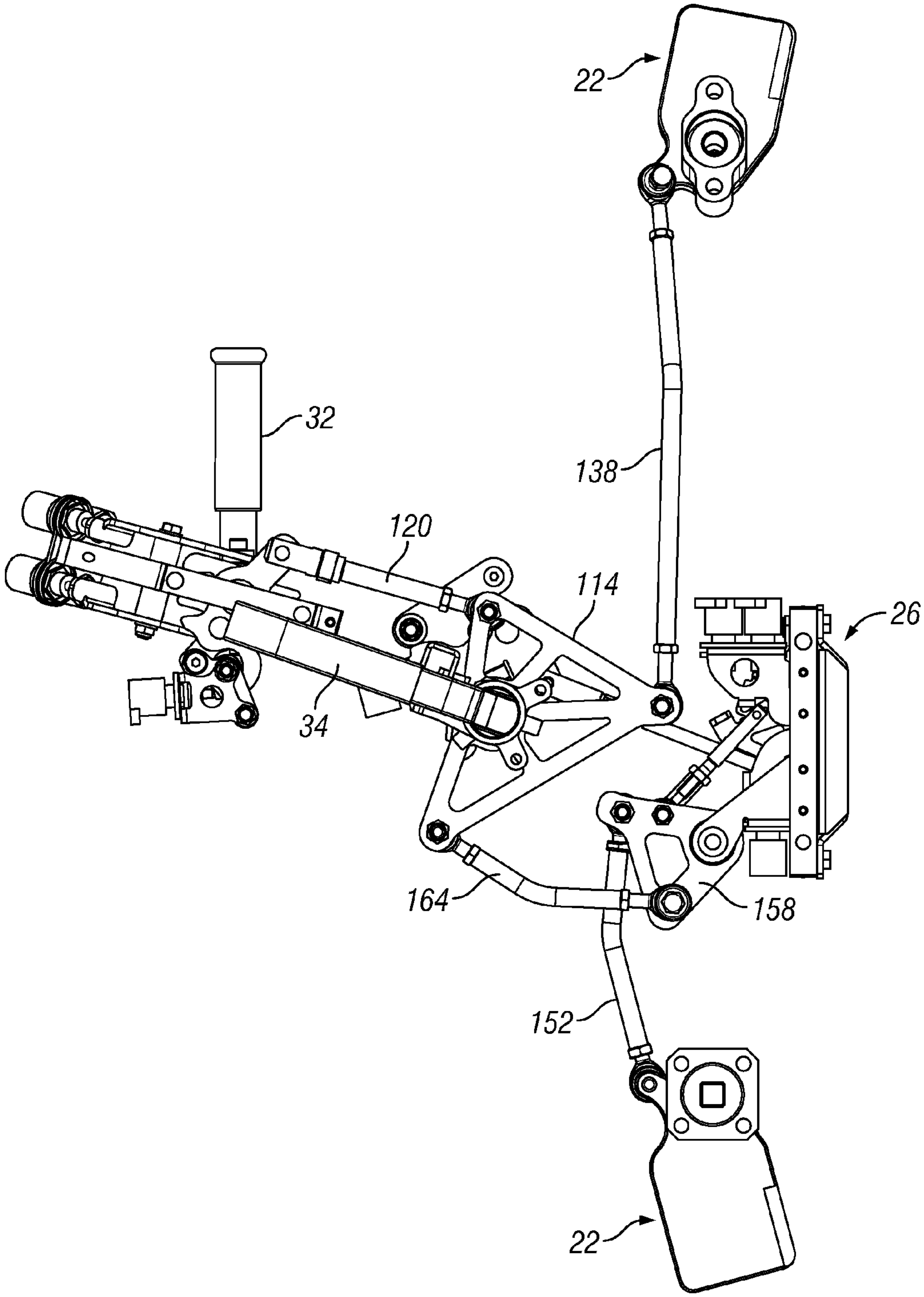

The latch assembly 20 is virtually the same for both the electronic and pneumatic power assist unit 18. FIGS. 19 and 20 show the latch assembly 22 for the electric power assist unit, while FIGS. 21 and 22 show the latch assembly for the pneumatic power assist unit. Like parts in FIGS. 19-22 are designated by the same reference numerals.

The latch assembly 22 includes a latch housing 210 having a conventional rotor 212 and a catch 213. The latch housing 210 is mounted on a bracket 214 with fasteners, such as screws or bolts 215. The bracket 214, in turn, is mounted to the door 12 for cooperation with a striker bolt (not shown) on the door frame. First and second latch trip levers 216, 218 are connected to the housing 210 by a pin or rivet 220 for pivotal movement about the axis of the pin or rivet 220. The use of two trip levers allow the internal trip lever to trip the latch even if the outside handle is locked. A striker position assembly 230 is mounted to the latch brackets 214 by screws 232. A trip lever sensor bracket 234 is also connected to the bracket 214 by another set of screws 232. The sensor bracket 234 is only used with an electric power assist unit 18, and not with a pneumatic power assist unit.

The striker position assembly 230 is further shown in FIGS. 27-30. This assembly 230 includes an L-shaped mounting bracket 236 having an upright leg 238 secured to the latch assembly bracket 214 by the screws 232, and a substantially horizontal leg 240 to which a position lever 242 is pivotally mounted via a pin 244. A spring 246 on the pin 244 biases the position lever 242 to a neutral position. The bracket 234 also includes a leg 248 with an opening 250 therein. This assembly 230 when used with a sensor or valve indicates if the stricker bolt (not shown) is in the latch, allowing some functions and limiting others.

The lower blast mounting block 132 includes an outwardly extending emergency accessed shaft 260 which extends through the door 12 such that the geometric end 262 of the shaft 260 resides outside the exterior skin of the door 12. The end 262 of the emergency access shaft 260 is adapted to matingly receive the geometric end 54 of the support 48 of the joystick assembly 32 from a similarly equipped vehicle in an emergency situation so that the blast lock assemblies 22 can be unlocked from outside the vehicle.

Operation of the Intuitive Door Control System

Entering a vehicle with the door intuitive control system 10 is as simple as rotating the exterior door handle 34 down from its neutral position. This action unlatches the door 12 and initiates the power unit 18 to open the door 12. The exterior handle 34 must be held in the down position to maintain door opening motion. As a safety feature, the operator can simply let go of the handle 34 at any time to immediately stop the door movement.

Once inside the vehicle, closing the door 12 takes very little effort—the occupant simply pulls inwardly on the inside handle 44 of the interior joystick assembly 32 until the door 12 is fully closed and latched. At any time, the operator can stop the closing motion of the door 12 by stopping the pull effort on the handle 44 or letting go of the handle 44 altogether. If the door 12 has not reached its fully closed position when the handle 44 is released, the handle 44 may be pulled inwardly once again to continue closing the door 12. The closing motion can also be quickly reversed by pushing outwardly on the handle 44 to re-open the door 12 to any position.

As a safety feature during the power assisted closing operation, if a part of the operator's body or a foreign object obstructs the path of the closing door 12, safety contact strips 264 arranged around the perimeter of the door 12 will be activated to immediately stop the door 12 from closing further and actually reverse the motion to take any pinch pressure off the contact point. Once the obstruction is removed, the door 12 can continue to be closed by pulling inwardly on the joystick handle 44.

Once the door 12 reaches it fully closed and latched position, to engage the blast combat locks 22, the operator simply moves the handle 44 forwardly toward the hinge. The operator may now let go of the handle and it will remain in the forward position and the combat latches 22 will remain engaged. With safety in mind, when the handle 44 is in the forward, locked position, the joystick assembly 32 design prevents the handle 44 from being unintentionally pushed out, thereby prohibiting accidental door opening. Openings in support bracket 36 prevent bearings 68 from transferring motion to sensors/valves if unintentially operated.

To open the door 12 and exit the vehicle, in one simple motion, the operator pulls the handle 44 rearwardly away from the hinge from its forward, locked position through its vertical neutral position to the end of its rearward travel. This one action disengages the combat locks 22, unlatches the automotive door latch 20 and actuates the power assist unit 18 so as to start the door 12 opening movement. The door 12 opening continues with operator pushing the handle outward until the desired open position is reached. The power actuator 18 is triggered when the handle 44 is pulled back to simultaneously disengage the blast locks 22. This initial trigger is enough to move the door open just beyond the latch point if the handle 44 is released immediately. The handle 44 then springs back to the vertical position where it can be moved in and out to control the door movement. The operator can also keep the handle 44 in the rearward position and the door actuator 18 will continue to open the door 12.

The size and the position of the handle 44 have been designed such that an occupant may open or close the door 12 even with both hands on a weapon or gear. It's possible to activate the open or closing operation with a forearm, elbow or shoulder pressed against the handle 44.

At any time, an operator inside the vehicle can instantly stop the power assisted opening or closing function by pressing an emergency stop button 266. After emergency stop activation, the door 12 can be opened or closed manually. Powered assist operation will be restored only after the emergency button has been reset by pulling it back out to its normal position.

Once outside the vehicle, the door 12 is easily closed by moving the exterior handle 34 upwardly. The handle 34 must be held in the up position to maintain power assisted closing.

When released, the three-position handle 34 will spring back to the horizontal neutral position—immediately stopping the power assisted closing at the present position. Once again, this is intended as a safety feature to stop assisted motion if the operator lets go of the handle 34. To restart the power assisted closing, the operator simply continues pulling up on the handle 34 until the door is fully closed and latched.

When closed from outside the vehicle, door 12 may be fully secured with a padlock to provide additional security.

As a security feature, when the door 12 is closed from inside the vehicle, and the combat locks 22 are engaged, the exterior handle won't open the door 12.

In an emergency, the interior handle 44 of the door 12 may be removed from another similarly equipped armored vehicle and used as an emergency latch release rescue wrench to allow authorized personnel to disengage the combat locks 22 from the outside and open the door 12 on a vehicle that is damaged or whose personnel have been disabled. The rescue joystick 32 is placed over the emergency exterior access shaft 260, with the end 54 of the joystick 32 matingly engaging the end 262 of the shaft 26, and rotated to mechanically disengage the combat latches 22 and open the door 12. The power assist unit 18 is operative during emergency opening of the door 12 from outside the vehicle, if power is available.

For a door with electric inputs, the electronic door control system includes an intelligent control, a plurality of switch inputs operatively connected to the intelligent control, the plurality of switch inputs associated with state of a plurality of mechanical components of the power assisted door, and motor drive operatively connected to the intelligent control for providing opening and closing of the power assisted door. The intelligent control is configured to monitor status of the plurality of switch inputs and control the motor drive at least partially based on the status of the plurality of switch inputs.

In regards to either electronic or valve type inputs, several switches as shown in FIGS. 1-5 or valves may be used to determine the position or intended operation of a power assist system. The switches/valves are typically spring loaded plunger style mechanisms that indicate or control an either normally open or normally closed current. The input devices may be adjustable or offer several separate inputs to control speed or other functions. The use of contact, contact-less, or wireless inputs may be used where required to give the intended signals to a control module or valve bank to form the logic of a typical door assist system.

Flexible features within the system 10 allow the opening and closing speeds to be varied to match the need of the vehicle or mission. The speed can be profiled to slowly start, speed up in the middle of travel and slow down at the end of travel as another way to insure safe operation.

The centerpiece of the door 12 functionality of the system 10 is the joystick assembly 32. Because the motion of the interior handle 44 intuitively leads to the motion of the hardware it controls, the system 10 is an intuitive motion control for assisting the powered opening and closing of the heavily armored doors and ramps used on today's military vehicles.

A remote toggle switch or other input device may be mounted off the door in a convenient location for the driver of a vehicle. This toggle switch may actuate an assist mechanism or separate power motion device to unlock the blast locks and initiate the open function of the door. The toggle switch can be configured to be held to cause motion or programmed to allow automatic operation. When pressed to the close position a remote toggle switch will close the door and engage the blast locks allowing the doors to be fully secure.

The intuitive door control system of the present invention can be further enhanced with an electronic control system, as described in co-pending application Ser. No. 12/713,029, entitled CONTROL SYSTEM FOR POWER-ASSISTED DOOR, filed on Feb. 25, 2010, and incorporated herein by reference.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A vehicle door mounted in a door frame for movement between open and closed positions, comprising:

a latch assembly moveable between latched and unlatched positions;

a lock assembly moveable between locked and unlocked positions;

a power unit mounted in the door with opposite ends connected to the door and the door frame;

a joystick on an interior side of the door;

the joystick being pivotal about first and second perpendicular axes;

whereby pivotal movement of the joystick about the first axis actuates the latch and lock assemblies; and whereby pivotal movement of the joystick about the second axis actuates the power unit to open and closed the door.

2. The vehicle door of claim 1 wherein the joystick pivots outwardly to open the door and pivots inwardly to close the door.

3. The vehicle door of claim 1 wherein the joystick pivots forwardly to lock and latch the door and pivots rearwardly to unlock and unlatch the door.

4. The vehicle door of claim 1 wherein the power unit is actuated in opposite directions by pivoting the joystick in opposite directions about the second pivot axis.

5. The vehicle door of claim 1 further comprising a handle on an exterior side of the door, coupled to the power unit, and pivotal so as to actuate the power unit for opening and closing the door.

6. The vehicle door of claim 5 wherein the handle is coupled to the latch assembly and pivotal movement of the handle actuates the latch assembly from the latched to unlatched positions.

7. The vehicle door of claim 5 wherein the power unit is actuated in opposite directions by pivoting the handle in opposite directions.

8. The vehicle door of claim 5 wherein the handle is biased to a neutral position.

9. The vehicle door of claim 1 wherein the joystick is biased to a neutral position.

10. The vehicle door of claim further comprising a shaft connected to the lock assembly and having an outer end extending outside the door, and a second joystick from a second similarly equipped vehicle door being mountable on the outer end of the shaft and pivotal to unlock the door for opening without actuation of the power unit.

* * * * *

UNITED STATES PATENT AND TRADEMARK OFFICE

CERTIFICATE OF CORRECTION

PATENT NO. : 8,132,844 B2
APPLICATION NO. : 12/712766
DATED : March 13, 2012
INVENTOR(S) : Sonnek et al.

It is certified that error appears in the above-identified patent and that said Letters Patent is hereby corrected as shown below:

Col. 8, Claim 10, Line 56:

ADD after claim --1--

Signed and Sealed this
Thirty-first Day of July, 2012

David J. Kappos
*Director of the United States Patent and Trademark Office*